United States Patent
Ryoo et al.

(10) Patent No.: US 10,484,996 B2
(45) Date of Patent: Nov. 19, 2019

(54) DEVICE AND METHOD FOR TRANSMITTING AND RECEIVING CONTROL INFORMATION IN WIRELESS COMMUNICATION SYSTEM

(71) Applicants: Samsung Electronics Co., Ltd., Gyeonggi-do (KR); Korea Advanced Institute of Science and Technology, Daejeon (KR)

(72) Inventors: Sunheui Ryoo, Gyeonggi-do (KR); Nam-I Kim, Daegu (KR); Sung-Jin Park, Gyeonggi-do (KR); Dong-Ho Cho, Seoul (KR)

(73) Assignees: Samsung Electronics Co., Ltd (KR); Korea Advanced Institute of Science and Technology (KR)

( * ) Notice: Subject to any disclaimer, the term of this patent is extended or adjusted under 35 U.S.C. 154(b) by 0 days.

(21) Appl. No.: 15/579,722

(22) PCT Filed: Jun. 1, 2016

(86) PCT No.: PCT/KR2016/005793
§ 371 (c)(1),
(2) Date: Dec. 5, 2017

(87) PCT Pub. No.: WO2016/195372
PCT Pub. Date: Dec. 8, 2016

(65) Prior Publication Data
US 2018/0184432 A1 Jun. 28, 2018

(30) Foreign Application Priority Data
Jun. 5, 2015 (KR) .......................... 10-2015-0079859

(51) Int. Cl.
*H04W 72/04* (2009.01)
*H04W 88/08* (2009.01)
(Continued)

(52) U.S. Cl.
CPC ....... *H04W 72/0473* (2013.01); *H04L 5/0053* (2013.01); *H04W 52/346* (2013.01);
(Continued)

(58) Field of Classification Search
CPC .......... H04W 72/0473; H04W 52/346; H04W 72/085; H04W 88/08; H04W 72/0406; H04W 88/02; H04L 5/0053
See application file for complete search history.

(56) References Cited

U.S. PATENT DOCUMENTS 9,877,279 B2 * 1/2018 Kim .................. H04J 11/005
9,893,853 B2 * 2/2018 Yi ............................ H04L 1/08
(Continued)

FOREIGN PATENT DOCUMENTS

| KR | 1020100062351 | 6/2010 |
| KR | 1020140125643 | 10/2014 |

OTHER PUBLICATIONS

PCT/ISA/210 Search Report issued on PCT/KR2016/005793 (pp. 3).
(Continued)

*Primary Examiner* — Ivan O Latorre
(74) *Attorney, Agent, or Firm* — The Farrell Law Firm, P.C.

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A base station operation method in a wireless communication system, according to an embodiment of the present invention, comprises the steps of: determining, on the basis of channel information received from each of a plurality of terminals, power to be used by each of the plurality of terminals with respect to resources allocated to be overlaid and used by the plurality of terminals; and transmitting resource information, which comprises information about the determined power, to each of the plurality of terminals.

16 Claims, 37 Drawing Sheets

(51) Int. Cl.
    *H04W 72/08*      (2009.01)
    *H04L 5/00*      (2006.01)
    *H04W 52/34*      (2009.01)
    *H04W 88/02*      (2009.01)

(52) U.S. Cl.
    CPC ......... *H04W 72/085* (2013.01); *H04W 88/08* (2013.01); *H04W 72/0406* (2013.01); *H04W 88/02* (2013.01)

(56) References Cited

U.S. PATENT DOCUMENTS

| | | | |
|---|---|---|---|
| 2003/0012313 A1* | 1/2003 | Husted | H03G 5/165 375/345 |
| 2004/0141566 A1 | 7/2004 | Kim et al. | |
| 2008/0014951 A1* | 1/2008 | Laroia | H04W 72/042 455/450 |
| 2009/0067382 A1* | 3/2009 | Li | H04L 5/0037 370/330 |
| 2009/0318183 A1* | 12/2009 | Hugl | H04L 5/0023 455/522 |
| 2010/0136939 A1 | 6/2010 | Kim et al. | |
| 2010/0311452 A1* | 12/2010 | Li | H04W 72/08 455/509 |
| 2011/0026392 A1* | 2/2011 | Wen | H04L 5/0007 370/203 |
| 2011/0066738 A1 | 3/2011 | Richardson et al. | |
| 2011/0080896 A1* | 4/2011 | Krishnamurthy | H04W 56/0045 370/336 |
| 2013/0012191 A1* | 1/2013 | Charbit | H04W 52/143 455/422.1 |
| 2014/0119322 A1* | 5/2014 | Wang | H04W 72/04 370/329 |
| 2014/0314006 A1 | 10/2014 | Suh et al. | |
| 2015/0003343 A1* | 1/2015 | Li | H04W 52/42 370/329 |
| 2015/0215944 A1* | 7/2015 | Kim | H04L 5/001 370/329 |
| 2015/0351081 A1* | 12/2015 | Zhu | H04J 11/003 370/329 |
| 2016/0014785 A1* | 1/2016 | Benjebbour | H04W 52/241 370/329 |
| 2016/0100413 A1* | 4/2016 | Hwang | H04B 7/0452 370/330 |
| 2016/0174230 A1* | 6/2016 | Benjebbour | H04W 52/346 370/329 |
| 2016/0366007 A1* | 12/2016 | Hwang | H04L 27/3809 |
| 2017/0078126 A1* | 3/2017 | Einhaus | H04J 11/0056 |
| 2018/0124815 A1* | 5/2018 | Papasakellariou | H04L 1/1671 |
| 2018/0184432 A1* | 6/2018 | Ryoo | H04W 72/0473 |
| 2018/0220433 A1* | 8/2018 | Li | H04B 7/0452 |

OTHER PUBLICATIONS

PCT/ISA/237 Written Opinion issued on PCT/KR2016/005793 (pp. 5).

3GPP TR 36.859 V13.0.0 (Dec. 2015), 3rd Generation Partnership Project; Technical Specification Group Radio Access Network; Study on Downlink Muliuser... Superposition Transmission (MUST) for LTE (Release 13), Copyright 2015, 3GPP Organizational Partners (ARIB, ATIS, CCSA, ETSI, TSDSI, TTA, TTC), pp. 48.

Ding, Zhiguo et al., Application of Non-Orthogonal Multiple Access in LTE and 5G Networks, IEEE Communications Magazine, Feb. 2017, Copyright 2017 IEEE, pp. 185-191.

Dai, Linglong et al., Non-Orthogonal Multiple Access for 5G: Solutions, Challenges, Opportunities, and Future Research Trends... IEEE Communications Magazine, Sep. 2015, Copyright 2015 IEEE, pp. 74-81.

Saito, Yuya et al., Non-Orthogonal Muliple Access (NOMA) for Cellular Future Radio Access, Copright 2013 IEEE, pp. 5.

Saito, Yuya et al., System-Level Performance Evaluation of Downlink Non-orthogonal Multiple Access (NOMA), 2013 IEEE 24th International Symposium on Personal, Indoor and Mobile Radio Communication: Fundamentals and PHY Track, Copyright 2013 IEEE, pp. 611-615.

\* cited by examiner

FIG.21A

| 2101 | 2103 | 2105 | 2107 | 2109 | 2111 |
|---|---|---|---|---|---|
| Allocation type indicator | Implicit transmission power | Terminal identifier | Resource allocation | Modulation and coding scheme | Group number |
| | 25(Integer) | Terminal1 | 01100011 (bit) | Scheme1 | 1(Integer) |

. . .

| 2113 | 2115 | 2117 | 2119 |
|---|---|---|---|
| Terminal identifier | Resource allocation | Modulation and coding scheme | Group number |
| Terminal 4 | 00000110 (bit) | Scheme 2 | 2(Integer) |

FIG.21B

DEVICE AND METHOD FOR TRANSMITTING AND RECEIVING CONTROL INFORMATION IN WIRELESS COMMUNICATION SYSTEM

PRIORITY

This application is a National Phase Entry of PCT International Application No. PCT/KR2016/005793 which was filed on Jun. 1, 2016, and claims priority to Korean Patent Application No. 10-2015-0079859, which was filed on Jun. 5, 2015, the content of each of which is incorporated herein by reference.

TECHNICAL FIELD

The present invention relates to technology for transmitting and receiving control information in a wireless communication system.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Technology is required for configuring control information for downlink data transmission in a NOMA-based wireless communication system and for minimizing the size of the control information.

DETAILED DESCRIPTION OF THE INVENTION

Technical Problem

Therefore, embodiments of the present invention provide an apparatus and a method for minimizing the size of control information for downlink data transmission by grouping resource blocks.

Embodiments of the present invention provide an apparatus and a method for minimizing the size of control information for downlink data transmission by allocating successive resources.

Embodiments of the present invention provide an apparatus and a method for minimizing the size of control information for downlink data transmission using a predefined resource allocation pattern.

Embodiments of the present invention provide an apparatus and a method for minimizing the size of control information for downlink data transmission using grouping of terminals and an implicit transmission power value.

Embodiments of the present invention provide an apparatus and a method for minimizing the size of control information for downlink data transmission using downlink control information in a downlink control channel.

Technical Solution

According to an embodiment of the present invention, an operation method of a base station in a wireless communication system includes: determining powers for use by each of a plurality of terminals with respect to a resource allocated to be shared by the plurality of terminals based on channel information received from each of the plurality of terminals; and transmitting resource information including information on the determined powers to each of the plurality of terminals.

An operation method of a terminal in a wireless communication system according to an embodiment of the present invention includes: receiving, from a base station, information on power for use of a resource allocated to the terminal; and detecting a signal received through the resource allocated to the terminal based on the information on the power.

A device of a base station in a wireless communication system according to another embodiment of the present invention includes: a control unit configured to determine powers for use by each of a plurality of terminals with respect to a resource allocated to be shared by the plurality of terminals based on channel information received from each of the plurality of terminals; and a communication unit configured to transmit resource information including information on the determined powers to each of the plurality of terminals.

A device of a terminal in a wireless communication system according to still another embodiment of the present invention includes: a communication unit configured to receive, from a base station, information on power for use of a resource allocated to the terminal; and a control unit configured to detect a signal received through the resource allocated to the terminal based on the information on the power.

BRIEF DESCRIPTION OF THE DRAWINGS

FIGS. 21a and 21b illustrate control information including information on implicit transmission power in a wireless communication system according to the fifth embodiment of the present invention;

MODE FOR CARRYING OUT THE INVENTION

Hereinafter, the operating principle of the present invention will be described in detail with reference to the accompanying drawings. In describing the present invention below, a detailed description of related known configurations or functions incorporated herein will be omitted when it is determined that the detailed description thereof may unnecessarily obscure the subject matter of the present invention. The terms which will be described below are terms defined in consideration of the functions in the present invention, and may be different according to users, intentions of the users, or customs. Therefore, the definitions of the terms should be made based on the contents throughout the specification.

Hereinafter, in the present invention, technology for allocating downlink resources in a wireless communication system will be described.

Figure 1:
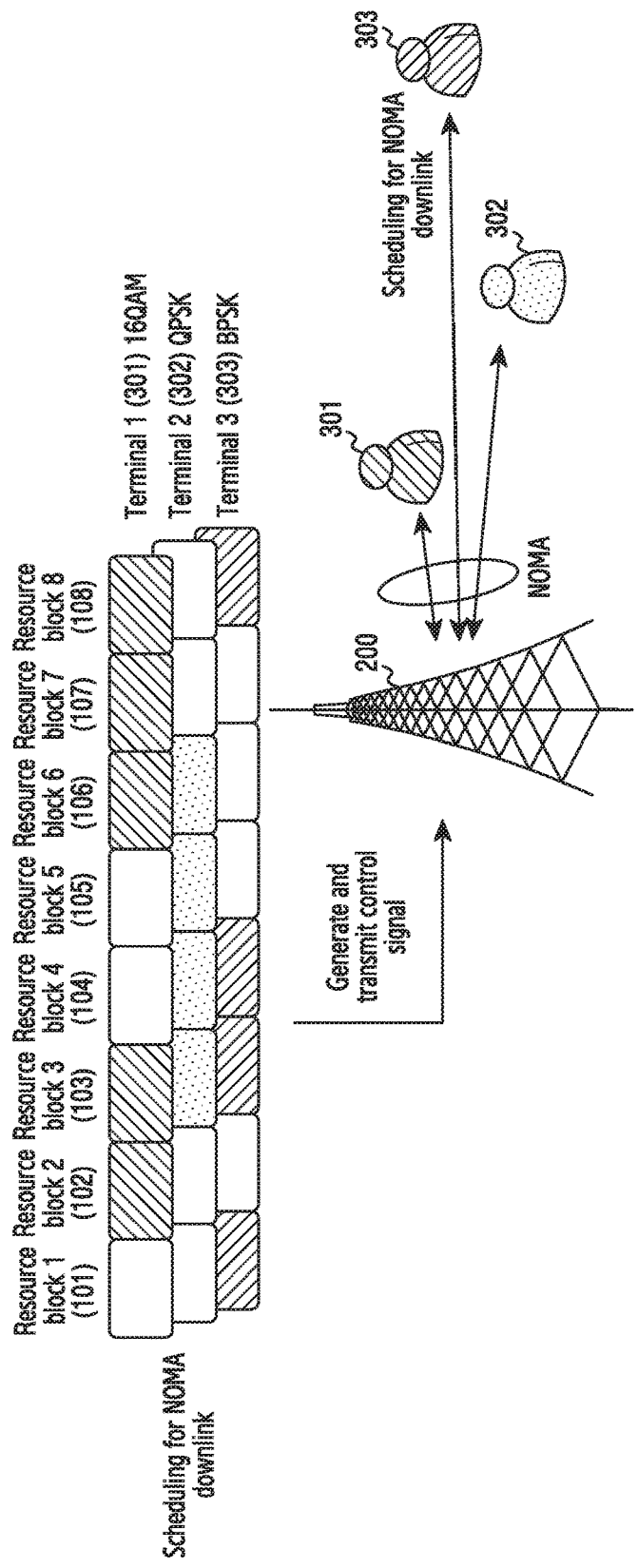
FIG. 1 illustrates an example in which a base station transmits control information to a plurality of terminals in a wireless communication system according to a first embodiment of the present invention.

FIG. 1 illustrates an example in which a base station transmits control information to a plurality of terminals in a wireless communication system according to a first embodiment of the present invention.

Recently, the issues of an explosive increase in data demand and demand for improvement in service quality for cell-edge users in the field of mobile communication have emerged. Further, as the Internet of Things (IoT) era is expected to come, the issue of mass connection for IoT implementation is also under consideration. In the present situation, a Non-Orthogonal Multiple Access (NOMA) system is raised as an alternative to a conventional orthogonal resource-based multiple access system.

Referring to FIG. 1, the NOMA system allows a plurality of terminals to share one Resource Block (RB), unlike an Orthogonal Multiple Access (OMA) system in which one terminal uses one RB. A base station 200 may allocate at least one RB among RBs 1 to 8 (101 to 108) to at least one terminal. For example, the base station 200 may allocate a RB 3 (103) to a terminal 1 (301), a terminal 2 (302), and a terminal 3 (303). Here, the terminal 1 (301), the terminal 2 (302), and the terminal 3 (303) may simultaneously use the RB 3 (103). Since the terminal 1 (301), the terminal 2 (302), and the terminal 3 (303) simultaneously use the RB 3 (103), interference may occur between the terminal 1 (301), the terminal 2 (302), and the terminal 3 (303) that are simultaneously using the RB 3 (103). The terminal 1 (301), the terminal 2 (302), and the terminal 3 (303) can each avoid such interference using a Successive Interference Cancellation (SIC) receiver in order to eliminate such interference. The SIC receiver can distinguish signals based on the difference in the power of the signals in the RB 3 (103).

As described above, in the NOMA system, one resource may be used by a plurality of terminals. Thus, the NOMA system may simultaneously support a plurality of terminals, compared to the OMA system. In the NOMA system, however, since a plurality of terminals uses a single resource at the same time, a process of decoding a received signal may be complicated. Therefore, in the NOMA system, the amount of control information for decoding may increase.

For example, in the OMA system, each terminal may decode a signal received by the terminal through control information on the terminal received from a base station. However, in the NOMA system, each terminal may decode a signal received by the terminal through pieces of control information on a plurality of terminals using one resource. Therefore, in a downlink environment of the NOMA system, each terminal needs to obtain, for SIC, an order of signal overlapping and power information allocated to each terminal. However, displaying the order of signal overlapping and the power information allocated to each terminal by RB for SIC may cause a very large system overload.

Figure 2:
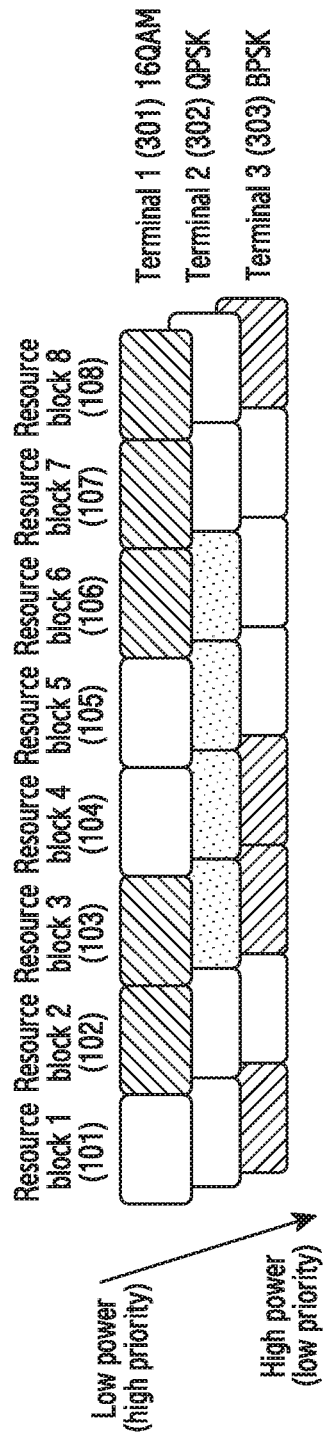
FIG. 2 illustrates a resource repetitively allocated to a plurality of terminals in a wireless communication system according to the first embodiment of the present invention.

FIG. 2 illustrates a resource repetitively allocated to a plurality of terminals in a wireless communication system according to the first embodiment of the present invention.

Referring to FIG. 2, the base station 200 may repetitively allocate the RB 3 (103) to the terminal 1 (301), the terminal 2 (302), and the terminal 3 (303). The base station 200 may repetitively allocate a RB 4 104 to the terminal 2 (302) and the terminal 3 (303). The base station 200 may repetitively allocate a RB 6 (106) to the terminal 1 (301) and the terminal 2 (302). The base station 200 may repetitively allocate a RB 8 (108) to the terminal 1 (301) and the terminal 3 (303). Here, the base station 200 may transmit control information illustrated in Table 1 to the terminal 1 (301), the terminal 2 (302), and the terminal 3 (303).

TABLE 1

|  | OMA system | NOMA system |
| --- | --- | --- |
| Terminal 1 | Allocate RBs 2, 3, 6, 7, and 8 16QAM | RB 2 (first priority, power) RB 3 (third priority, power) RB 6 (second priority, power) RB 7 (first priority, power) RB 8 (second priority, power) 16QAM |
| Terminal 2 | Allocate RBs 3, 4, 5, and 6 QPSK | RB 3 (second priority, power) RB 4 (second priority, power) RB 5 (first priority, power) RB 6 (first priority, power) QPSK |

TABLE 1-continued

|  | OMA system | NOMA system |
| --- | --- | --- |
| Terminal 3 | Allocate RBs 1, 3, 4, and 8 BPSK | RB 1 (first priority, power) RB 3 (first priority, power) RB 4 (first priority, power) RB 8 (first priority, power) BPSK |

Figure 3:
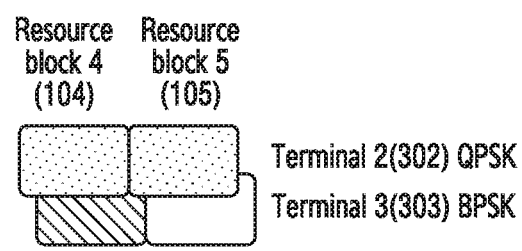
FIG. 3 illustrates a resource repetitively allocated to a plurality of terminals in a wireless communication system according to the first embodiment of the present invention.

FIG. 3 illustrates a resource repetitively allocated to a plurality of terminals in a wireless communication system according to the first embodiment of the present invention.

Referring to FIG. 3, the base station 200 may repetitively allocate a RB 4 (104) to the terminal 2 (302) and the terminal 3 (303). For example, the base station 200 may allocate the RB 4 (104) to the terminal 2 (302) using Quadrature Phase Shift Keying (QPSK). Further, the base station 200 may allocate the RB 4 (104) to the terminal 3 (303) using Binary Phase Shift Keying (BPSK). The base station 200 may allocate higher power to the terminal 3 (303) than that to the terminal 2 (302) for the RB 4 (104). In addition, the base station 200 may allocate lower power to the terminal 2 (302) than that to the terminal 3 (303) for the RB 4 (104).

The base station 200 may transmit, to the third terminal 3 (303), control information including information indicating that the SIC ranking of the terminal 3 (303) in the RB 4 (104) is the first ranking. Also, the base station 200 may transmit, to the terminal 2 (302), control information including information indicating that the SIC ranking of the terminal 3 (303) in the RB 4 (104) is the first ranking.

Based on the control information, the terminal 3 (303) may identify that the SIC ranking of the terminal 3 (303) in the RB 4 (104) is the first ranking. Therefore, the terminal 3 (303) may perform direct decoding in the RB 4 (104) instead of performing SIC.

Figure 4A:
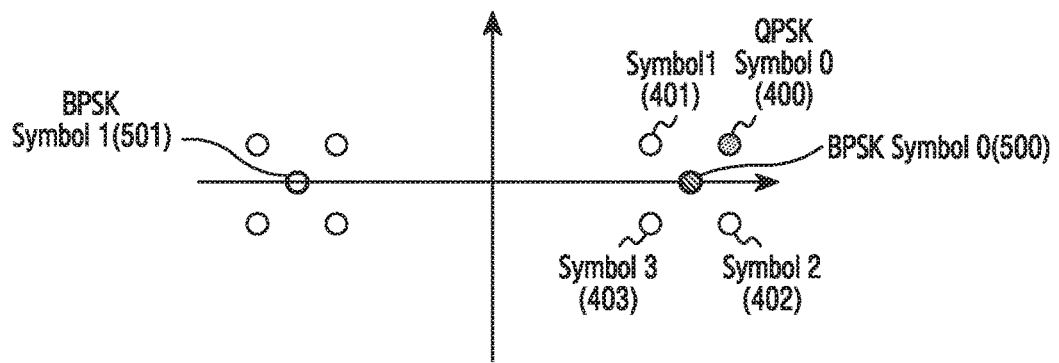
FIGS. 4a and 4b are constellation diagrams illustrating symbols overlapping in one resource in a wireless communication system according to the first embodiment of the present invention.
Figure 4B:
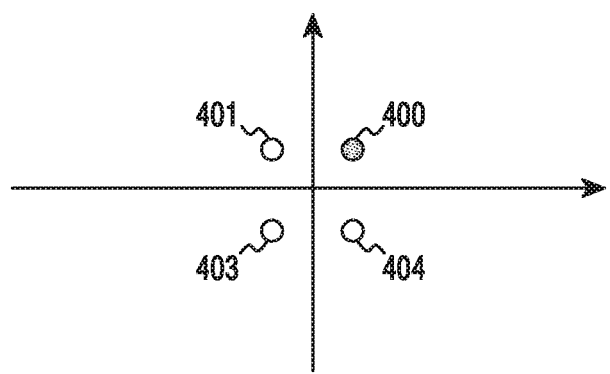

For example, referring to FIG. 4a, the terminal 3 (303) may detect a BPSK symbol 0 (500) through such direct decoding. Based on the control information, the terminal 2 (302) may identify that the SIC ranking of the terminal 2 (302) in the RB 4 is the second ranking. Accordingly, the terminal 2 (302) may perform SIC in the RB 4 (104). The terminal 2 (302) may identify a component of a signal transmitted to the terminal 3 (303) and power allocated for the signal. The terminal 3 (303) may eliminate interference based on the component of the signal and the power allocated for the signal. For example, referring to FIG. 4b, the terminal 2 (302) may detect a QPSK symbol 0 (400).

Figure 5A:
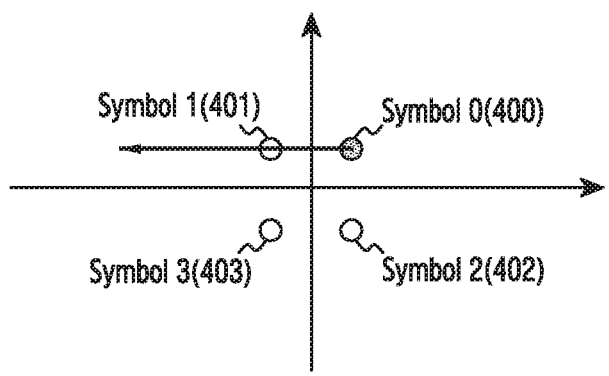
FIGS. 5a and 5b illustrate an example of decoding symbols overlapping in one resource in a wireless communication system according to the first embodiment of the present invention.
Figure 5B:
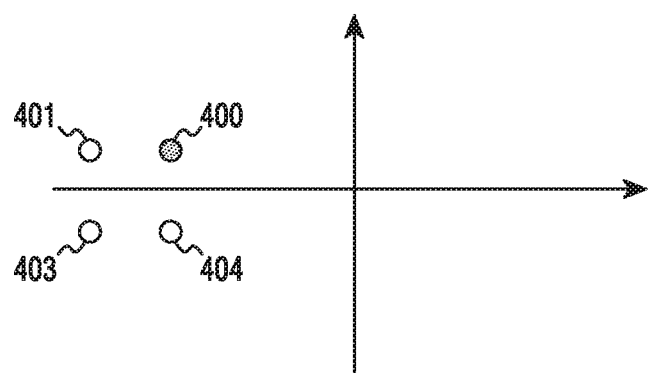

According to another embodiment of the present invention, the terminal 3 (303) may not perform the SIC. For example, referring to FIG. 5a, the terminal 3 (303) may perform the SIC in a situation where the SIC should not be performed. Referring to FIG. 5b, when the QPSK symbol 0 (400) is transmitted to the terminal 2 (302) but the terminal 3 (303) performs the SIC, a QPSK symbol 1 (401) may be detected.

Figure 6:
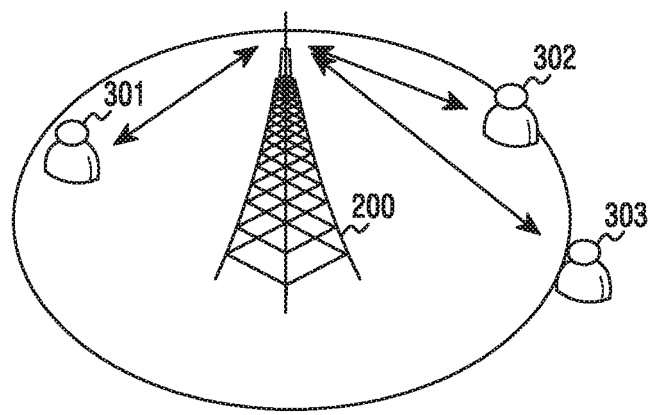
FIG. 6 illustrates an environment for communication between a base station and terminals in a wireless communication system according to the first embodiment of the present invention.

FIG. 6 illustrates an environment for communication between a base station and terminals in a wireless communication system according to the first embodiment of the present invention.

Referring to FIG. 6, the base station 200 may perform communication with the terminals through an uplink and a downlink. For example, the base station 200 may transmit data to the terminals through the downlink. Also, the base station 200 may receive data from the terminals through the uplink.

The terminals include a communication tool for performing communication with the base station 200. The terminals are an electronic device that the user can carry. For example, the terminals may be one of a smartphone, a portable terminal, a mobile phone, a mobile pad, a media player, a tablet computer, a handheld computer, a Personal Digital Assistant (PDA), a wireless controller, and a wearable device, and may also be a device having functions of two or more of the aforementioned devices.

For example, the terminals may be one of a smart TV, a monitor, a speaker, a woofer, a black box, a wristwatch-type terminal, a glasses-type terminal, an electronic device with a communication function that is attachable to clothing, a camera, a beam projector, a Closed Circuit Television (CCTV), a printer, a fax, a three-dimensional (3D) printer, a smartphone, a portable terminal, a mobile phone, a mobile pad, a media player, a tablet computer, a handheld computer, and a PDA, or may be a device having functions of two or more of the aforementioned devices.

The terminals may perform initial access to the base station via random access or handover. The base station 200 may transmit a reference signal to the terminals. Each of the terminals may measure a channel state thereof based on the reference signal. Each of the terminals may report information on the measured channel state thereof to the base station 200.

Figure 7:
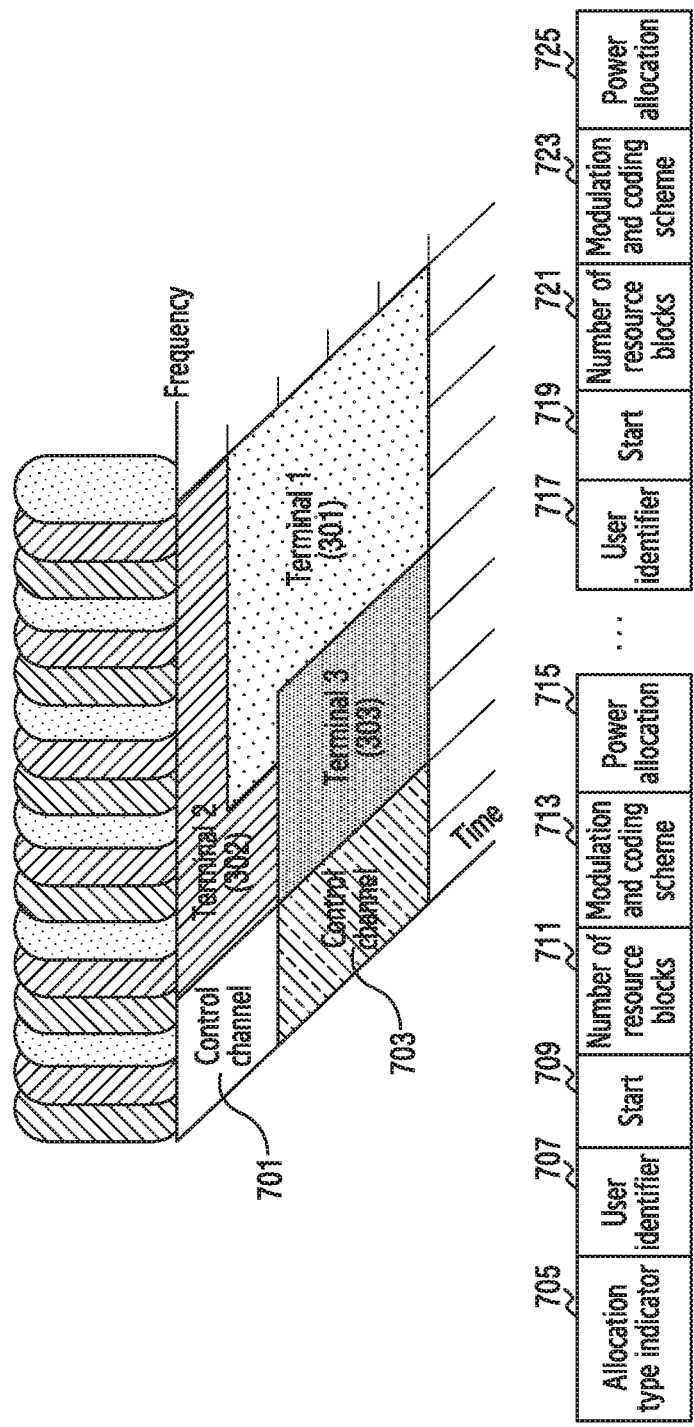
FIG. 7 illustrates control information generated by a base station in a wireless communication system according to the first embodiment of the present invention.

FIG. 7 illustrates control information generated by a base station in a wireless communication system according to the first embodiment of the present invention.

Figure 8:
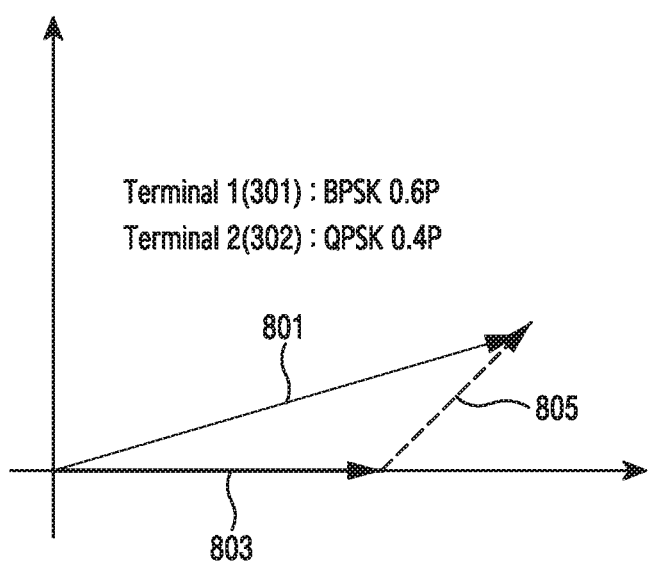
FIG. 8 illustrates an example of decoding performed by terminals sharing one resource in a wireless communication system according to the first embodiment of the present invention.

Referring to FIG. 7, the base station 200 may receive information on a channel state from a plurality of terminals in a cell. The base station 200 may repetitively allocate an available resource to the plurality of terminals based on the information on the channel state. The base station 200 may generate control information including information on the resource allocated to the plurality of terminals. The base station 200 may transmit the control information and data to each of the plurality of terminals. Each of the plurality of terminals may detect a data signal thereof based on the control information received from the base station 200. For example, referring to FIG. 8, the terminal 1 (301) may be allocated a resource with a power ratio of 0.6 from the base station 200 in a BPSK scheme. In addition, the terminal 2 (302) may be allocated the resource with a power ratio of 0.4 from the base station 200 in a QPSK scheme. Here, from the terminal 1 (301) and the terminal 2 (302) receives, from the base station 200, a vector 801 that is the sum of a vector 805 transmitted for the terminal 1 (301) and a vector 803 transmitted for the terminal 2 (302). The terminal 1 (301) and the terminal 2 (302) may detect a data signal thereof using the received vector 801 and SIC.

Figure 9:
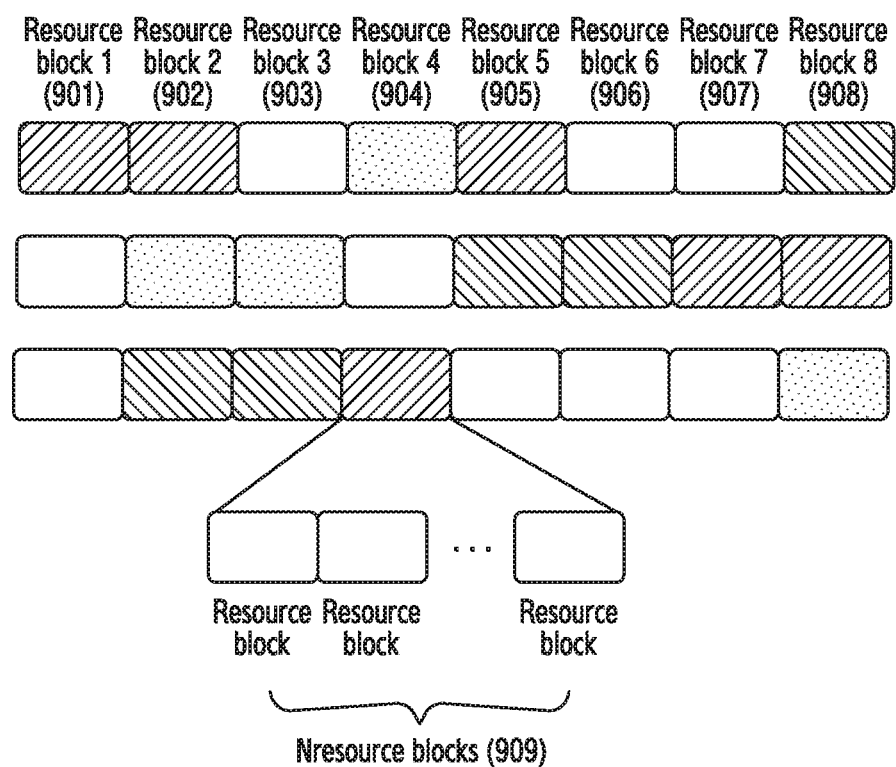
FIG. 9 illustrates a resource block group generated by a base station in a wireless communication system according to a second embodiment of the present invention.

FIG. 9 illustrates a RB group generated by a base station in a wireless communication system according to a second embodiment of the present invention.

Referring to FIG. 9, the base station 200 may generate at least one RB group including at least one RB. The base station may generate control information on the at least one RB group. Here, the base station generates the control information on the at least one RB group, instead of control information on all RBs, thereby reducing the size of the control information.

Figure 10:
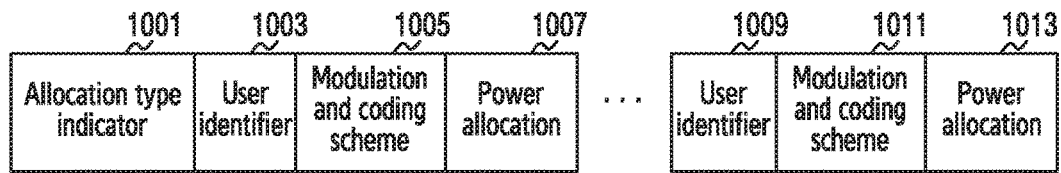
FIG. 10 illustrates control information in a wireless communication system according to the second embodiment of the present invention.

For example, the control information may be illustrated in FIG. 10. Referring to FIG. 10, the control information may include information on an allocation type indicator 1001, user identifiers 1003 and 1009, Modulation and Coding Schemes (MCSs) 1005 and 1011, and power allocations 1007 and 1013.

The allocation type indicator 1001 refers to an indicator indicating a scheme in which the base station 200 allocates at least one resource to at least one terminal. For example, the allocation type indicator 1001 refers to information indicating which of the first to sixth embodiments of the present invention is used. The allocation type indicator 1001 may be expressed in a predefined binary number.

The user identifiers 1003 and 1009 refer to information for identifying a user of a terminal. For example, the user identifier 1003 may be a unique number assigned to all terminals in the system in order to identify each user. The user identifiers 1003 and 1009 may be expressed in a predefined binary number.

The MCSs 1005 and 1011 refer to an MCS that the base station 200 performs on data transmitted to at least one terminal. The MCS may be predefined between the base station 200 and the at least one terminal. The MCS 1005 refers to 16QAM, QPSK, BPSK, or at least one other modulation scheme. The MCS 1005 may be expressed in a predefined binary number.

The power allocations 1007 and 1013 refer to information on a power ratio with respect to a resource that the base station allocates to each terminal. Each terminal may identify a power ratio with respect to a resource allocated to the terminal based on the power allocations 1007 and 1013. The same effect may be obtained even when the power allocations 1007 and 1013 display absolute value information on allocated power.

Figure 11A:
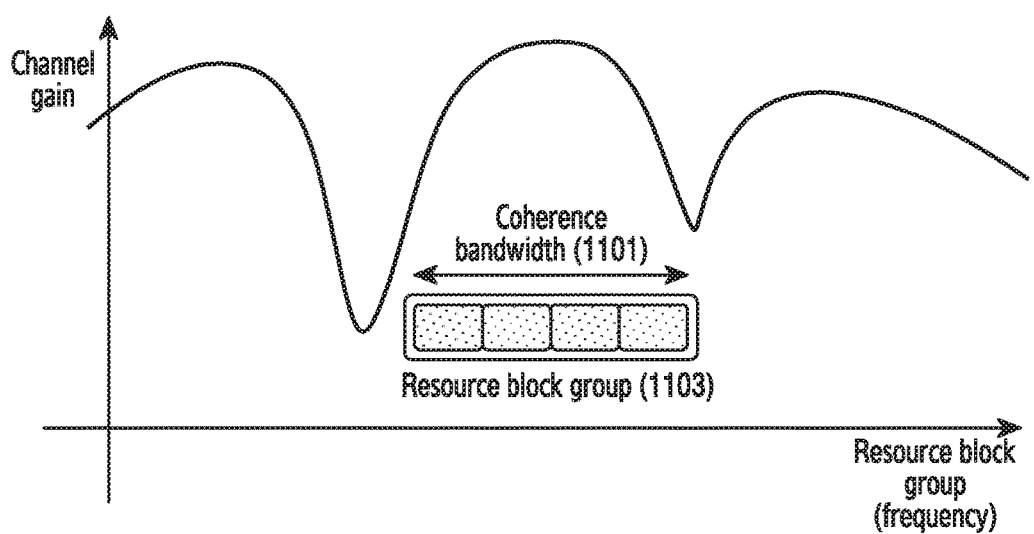
FIGS. 11a and 11b illustrate examples of a resource block group according to a coherence bandwidth in a wireless communication system according to the second embodiment of the present invention.
Figure 11B:
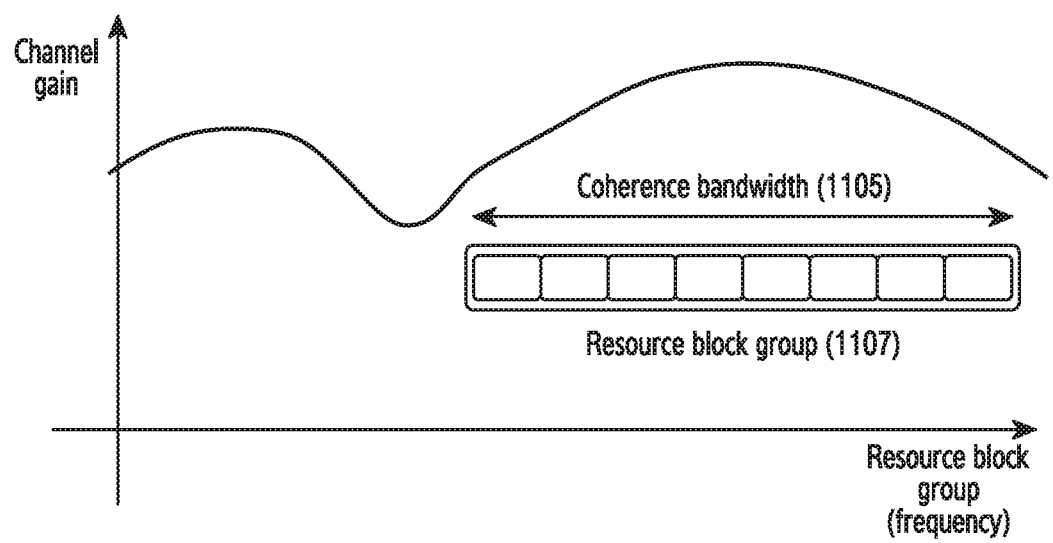

The base station 200 may determine the RB group based on a coherence bandwidth. For example, referring to FIG. 11a, the base station 200 may generate four RB groups based on the length of a coherence bandwidth. Also, referring to FIG. 11b, the base station 200 may generate eight RB groups based on the length of a coherence bandwidth.

The base station 200 may prevent a resource from being forcibly allocated to a channel with low frequency efficiency, thereby improving frequency efficiency. Also, when a small-capacity control signal is required, the base station 200 may generate a relatively large number of RB groups.

The base station 200 may determine a minimum coherence bandwidth among channels simultaneously allocated to a plurality of terminals. The base station 200 may allocate a RB group in proportion to the minimum coherence bandwidth. The base station 200 may achieve optimal frequency efficiency through the RB group allocated in proportion to the minimum coherence bandwidth.

The base station 200 may allocate a RB group based on an average value of coherence bandwidth values simultaneously allocated to a plurality of terminals.

The base station 200 may allocate a RB group having a length equal to or greater than a coherence bandwidth simultaneously allocated to a plurality of terminals. The base station 200 may allocate the RB group having the length equal to or greater than the coherence bandwidth, thereby producing the effect of reducing the length of a control signal.

The base station 200 may generate control information illustrated in Table 2.

TABLE 2

| User identifier | Power allocation | | | | | | | | MCS |
|---|---|---|---|---|---|---|---|---|---|
| | RB 1 | RB 2 | RB 3 | RB 4 | RB 5 | RB 6 | RB 7 | RB 8 | |
| Terminal 1 | 1 | 0.1 | 0 | 0.8 | 0.2 | 0 | 1 | 0.3 | MCS 1 |
| Terminal 2 | 0 | 0.3 | 0.3 | 0.2 | 0 | 0 | 0 | 0.6 | MCS 2 |
| Terminal 3 | 0 | 0.6 | 0.7 | 0 | 0.8 | 1 | 0 | 0.1 | MCS 3 |

The base station 200 may transmit the control information illustrated in Table 2 to each of the plurality of terminals. According to another embodiment of the present invention, the power allocation may be represented by the absolute value of power actually allocated to a terminal, instead of a value ranging from 0 to 1 as illustrated in Table 2.

Figure 12:
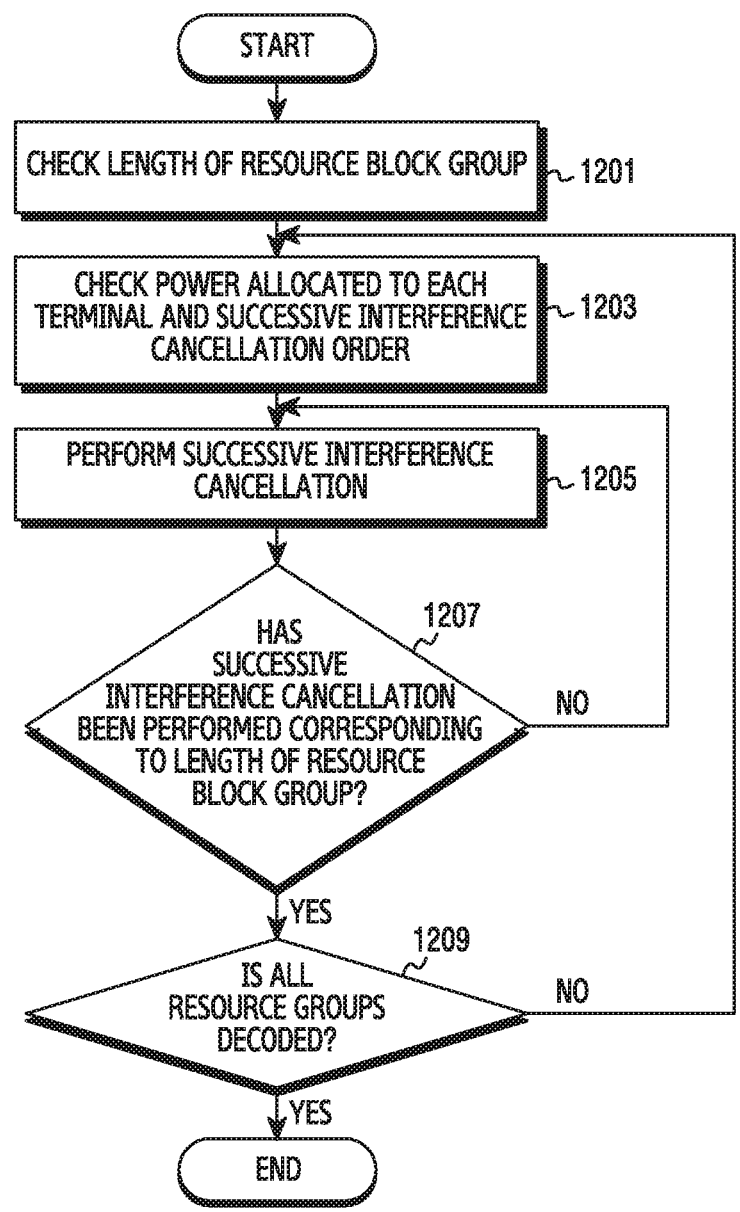
FIG. 12 is a flowchart illustrating an operation in which a terminal decodes a signal in a wireless communication system according to the second embodiment of the present invention.

FIG. 12 is a flowchart illustrating an operation in which a terminal decodes a signal in a wireless communication system according to the second embodiment of the present invention.

Referring to FIG. 12, in operation 1201, the terminal 300 checks the length of a RB group. The length of the RB group may be changed depending on the state of a channel between the terminal 300 and the base station 200 or a system configuration.

In operation 1203, the terminal 300 checks the level of power allocated to each terminal and the SIC order of terminals. The terminal 300 may determine the SIC order based on the level of power allocated to each terminal. In operation 1205, the terminal 300 may perform the SIC based on the SIC order.

In operation 1207, the terminal 300 determines whether the SIC has been performed corresponding to the length of the RB group. When the terminal 300 has performed the SIC corresponding to the length of the RB group, the terminal 300 may perform operation 1209. When the terminal 300 has not performed the SIC corresponding to the length of the RB group, the terminal 300 may return to operation 1205 and may perform the SIC.

In operation 1209, the terminal 300 determines whether the SIC has been performed with respect to all RB groups. When the terminal 300 has not performed the SIC with respect to all RB groups, the terminal 300 returns to operation 1203 and checks the power allocated to each terminal and the SIC order of the terminals. The base station 200 may adjust the length of the RB group. Therefore, the base station 200 may adjust the number of RBs included in the RB group according to the channel change. In addition, the base station 200 may adjust a power allocation ratio since power allocated to each RB group is represented by a ratio and the absolute value of the allocated power. Thus, the base station 200 may adjust the overlapping order of a plurality of terminals using a repetitively allocated resource. Further, the base station 200 may report the overlapping order to the plurality of terminals.

Figure 13:
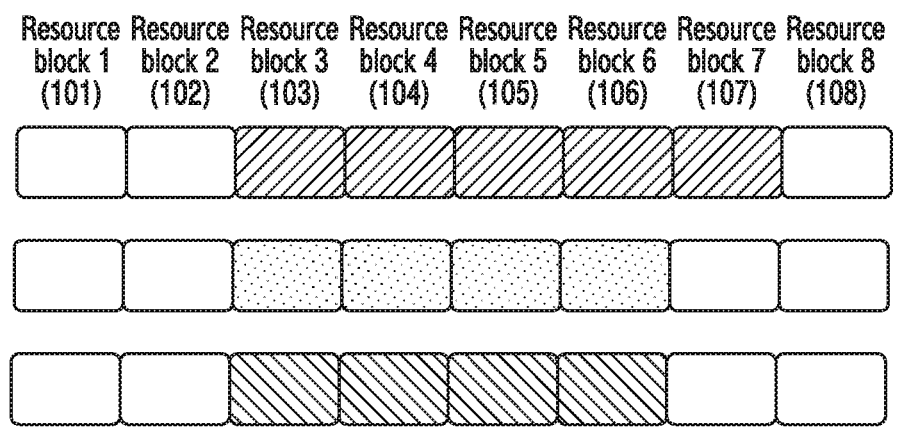
FIG. 13 illustrates successive resources allocated by a base station in a wireless communication system according to a third embodiment of the present invention.

FIG. 13 illustrates successive resources allocated by a base station in a wireless communication system according to a third embodiment of the present invention.

Referring to FIG. 13, the base station 200 may allocate successive resources to at least one terminal. The base station 200 may generate control information including at least one of the start point of the allocated successive resources, the number of RBs, and the end point of the allocated successive resources. Here, the size of the control information may be reduced in inverse proportion to the length of the allocated successive resources.

The control information on the RBs allocated in FIG. 13 may be one illustrated in Table 3.

TABLE 3

| User identifier | Start point | Number of RBs | MCS | Power allocation ratio |
| --- | --- | --- | --- | --- |
| Terminal 1 | RB 3 | 5 | MCS 1 | 0.1 |
| Terminal 2 | RB 3 | 4 | MCS 2 | 0.3 |
| Terminal 3 | RB 3 | 4 | MCS 3 | 0.6 |

Figure 14:
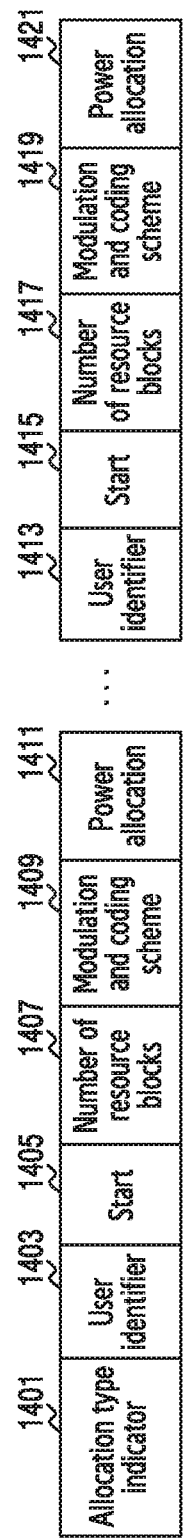
FIG. 14 illustrates control information including information on the start point of a resource in a wireless communication system according to a third embodiment of the present invention.

According to another embodiment of the present invention, the control information may be one illustrated in FIG. 14. The end points of RBs allocated by the base station 200 to the plurality of terminals may not be the same. When the end points of the RBs allocated to the plurality of terminals are not the same, a resource may not be allocated to at least one terminal among the plurality of terminals. When a resource is not allocated to at least one of the plurality of terminals, the resource may be wasted.

In order to reduce such waste, the base station 200 may repeat data of a terminal having the best channel state, that is, the terminal allocated the lowest power, in the overlapping order, thereby matching the end point of RBs allocated to the terminal having the best channel state with the end point of RBs allocated to at least one other terminal.

The terminal having the best channel state may perform SIC even though a signal to be decoded by the terminal is repeated, thereby decoding all signals to be decoded by the terminal.

Figure 15A:
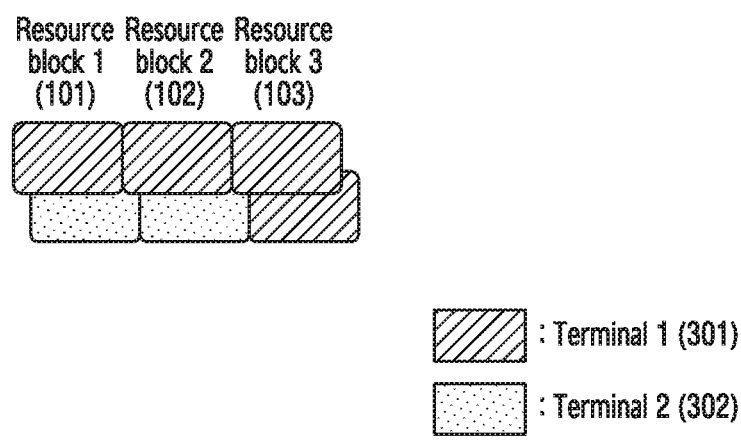
FIGS. 15a and 15b illustrate examples in which a base station allocates a resource to a plurality of terminals in a wireless communication system according to a third embodiment of the present invention.
Figure 15B:
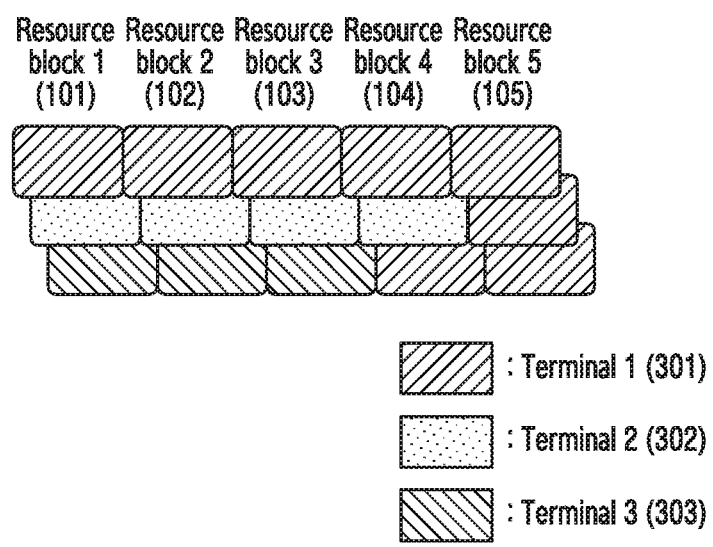

For example, as illustrated in FIGS. 15a and 15b, the base station 200 may allocate RBs. Referring to FIG. 15a, the base station 200 may allocate RBs 1 to 3 (101 to 103) to a terminal 1 (301). Further, the base station 200 may allocate the RB 1 (101) and the RB 2 (102) to a terminal 2 (302). The base station 200 may receive channel state information from the terminal 1 (301) and the terminal 2 (302). The base station 200 may determine the channel state of the terminal 1 (301) and the channel state of the terminal 2 (302) based on the channel state information. For example, the base station 200 may determine that the channel state of the terminal 1 (301) is better than the channel state of the terminal 2 (302). Here, the base station 200 may input data included in the RB 3 (103) allocated to the terminal 1 (301) to the RB 3 (103) not used by the terminal 2 (302). That is, the base station 200 may match the end point of the RBs allocated to the terminal 1 (301) with the end point of the RBs allocated to the terminal 2 (302).

Referring to FIG. 15b, the base station 200 may allocate RBs 1 to 5 (101 to 105) to the terminal 1 (301). The base station 200 may allocate RBs 1 to 4 (101 to 104) to the terminal 2 (302). In addition, the base station 200 may allocate RBs 1 to 3 (101 to 103) to a terminal 3 (303). The base station 200 may receive channel information from each of the terminal 1 (301), the terminal 2 (302), and the terminal 3 (303). The base station 200 may determine a terminal having the best channel state among the terminal 1 (301), the terminal 2 (302), and the terminal 3 (303) based on the channel information. For example, the base station 200 may determine that the terminal 1 (301) has the best channel state based on the channel information. Here, the base station 200 may repetitively include data of the terminal 1 (301) in the RB 5 (105) not used by the terminal 2 (302) and in the RB 4 (104) not used by the terminal 3 (303). That is, the base station 200 may match the end points of the RBs allocated to the terminal 1 (301), the terminal 2 (302), and the terminal 3 (303) with each other.

Figure 16:
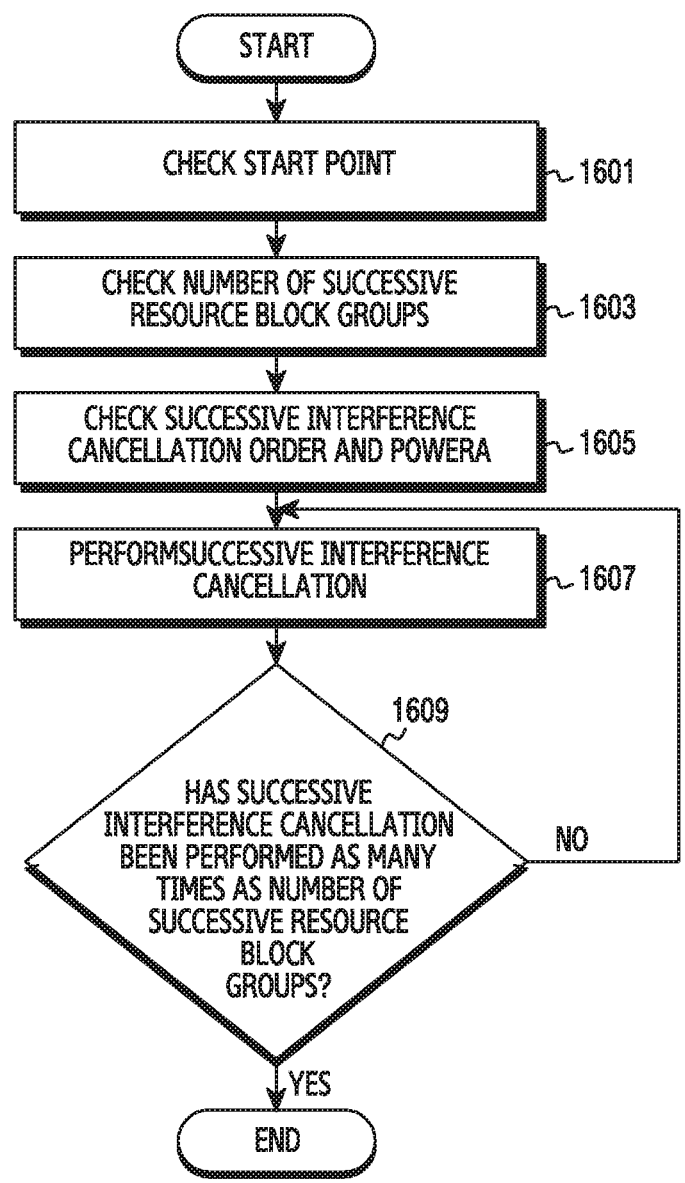
FIG. 16 is a flowchart illustrating an operation in which a terminal decodes a signal received through successively allocated resources in a wireless communication system according to the third embodiment of the present invention.

FIG. 16 is a flowchart illustrating an operation in which a terminal decodes a signal received through successively allocated resources in a wireless communication system according to the third embodiment of the present invention.

Referring to FIG. 16, in operation 1601, the terminal 300 checks the start point of RBs. The terminal 300 may check the start point of the RBs allocated to the terminal 300 and the length of the RBs based on control information received from the base station 200.

In operation 1603, the terminal 300 checks the number of successively allocated RBs. The terminal 300 may check the number of the RBs allocated to the terminal 300 based on the control information received from the base station 200.

In operation 1605, the terminal 300 checks a SIC order and allocated power. The terminal 300 may check the SIC order and the power allocated for the RBs allocated to the terminal based on the control information.

In operation 1607, the terminal 300 performs SIC. The terminal 300 may perform the SIC based on the SIC order. In operation 1607, the terminal having the best channel state may also decode data thereof forcibly allocated in another overlapping order so as to match the end point of an allocated resource.

In operation 1609, the terminal 300 determines whether the SIC has been performed as many times as the number of successively allocated RBs. When it is determined that the SIC has not been performed as many times as the number of successively allocated RBs, the terminal 300 may return to operation 1607 and may perform the SIC.

Figure 17:
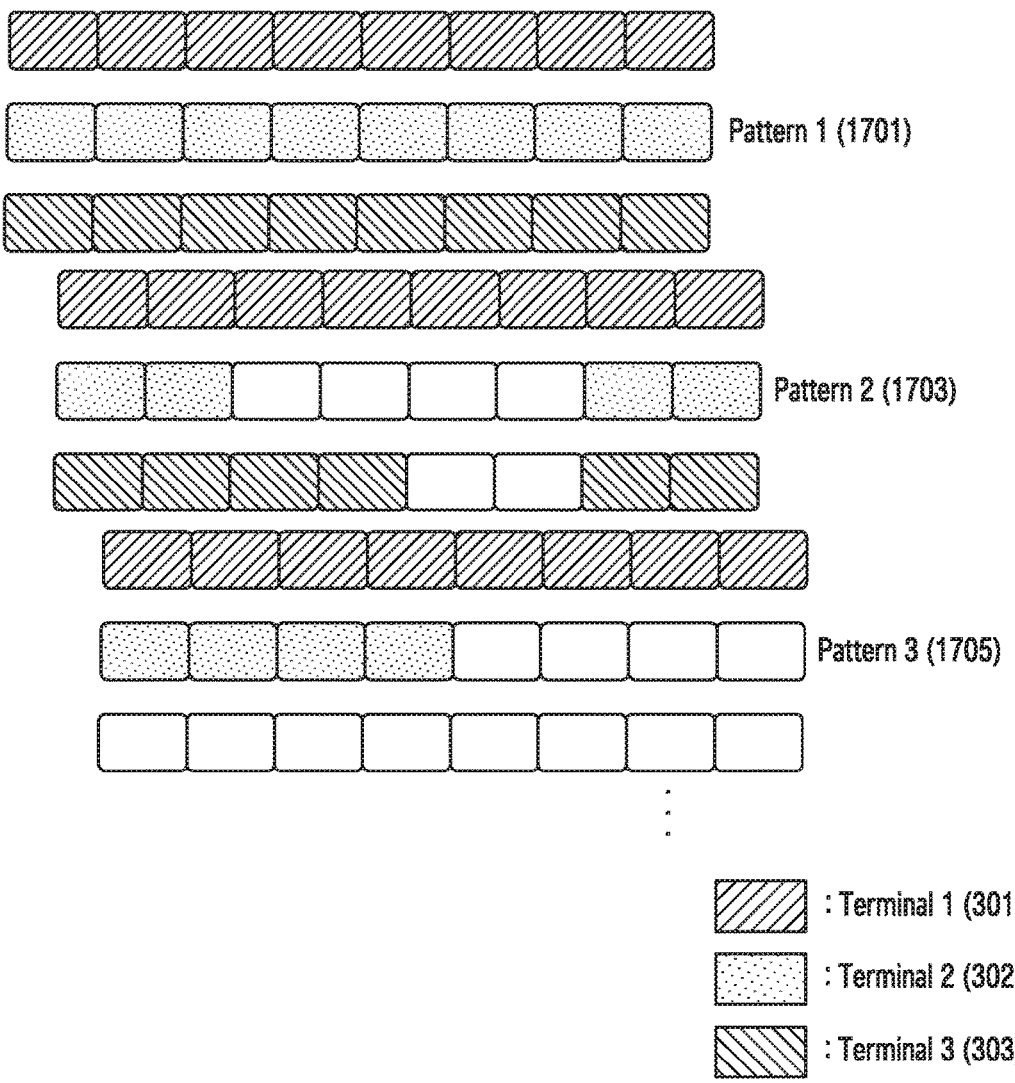
FIG. 17 illustrates resource blocks allocated by a base station according to a resource allocation pattern in a wireless communication system according to a fourth embodiment of the present invention.

FIG. 17 illustrates RBs allocated by a base station according to a resource allocation pattern in a wireless communication system according to a fourth embodiment of the present invention.

Referring to FIG. 17, the base station 200 may allocate eight RBs to each of three terminals according to a pattern 1 (1701).

Further, the base station 200 may allocate RBs 1 to 8 (101 to 108) to a terminal 1 (301), may allocate the RB 1 (101), the RB 2 (102), the RB 7 (107) and the RB 8 (108) to a terminal 2 (302), and may allocate the RBs 1 to 4 (101 to 104), the RB 7 (107) and the RB 8 (108) to a terminal 3 (303) according to a pattern 2 (1703).

In addition, the base station 200 may allocate the RBs 1 to 8 (101 to 108) to the terminal 1 (301), may allocate the RBs 1 to 4 (101 to 104) to the second terminal 2 (302), and may not allocate any RB to the terminal 3 (303) according to a pattern 3 (1705).

The base station 200 may predetermine patterns of RBs allocated to each terminal based on statistical analysis. The base station 200 may generate information on the patterns. The base station 200 may transmit the information on the patterns to the terminals.

Figure 18:
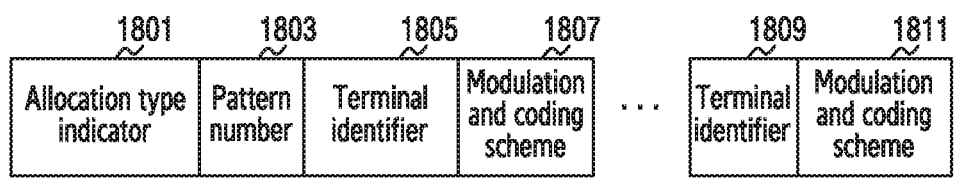
FIG. 18 illustrates control information including information on a resource allocation pattern in a wireless communication system according to a fourth embodiment of the present invention.

For example, the information on the patterns may be one illustrated in FIG. 18. Referring to FIG. 18, the information on the patterns may include an allocation type indicator 1801, a pattern number, a terminal identifier, and an MCS.

The information on the patterns may be represented by Table 4.

TABLE 4

| Pattern number | Position 1 | | Position 2 | | Position 3 | |
|---|---|---|---|---|---|---|
| | User identifier | MCS | User identifier | MCS | User identifier | MCS |
| 1 | Terminal 1 (identifier number) | Scheme 1 | Terminal 2 (identifier number) | Scheme 2 | Terminal 3 (identifier number) | Scheme 3 |

Figure 19:
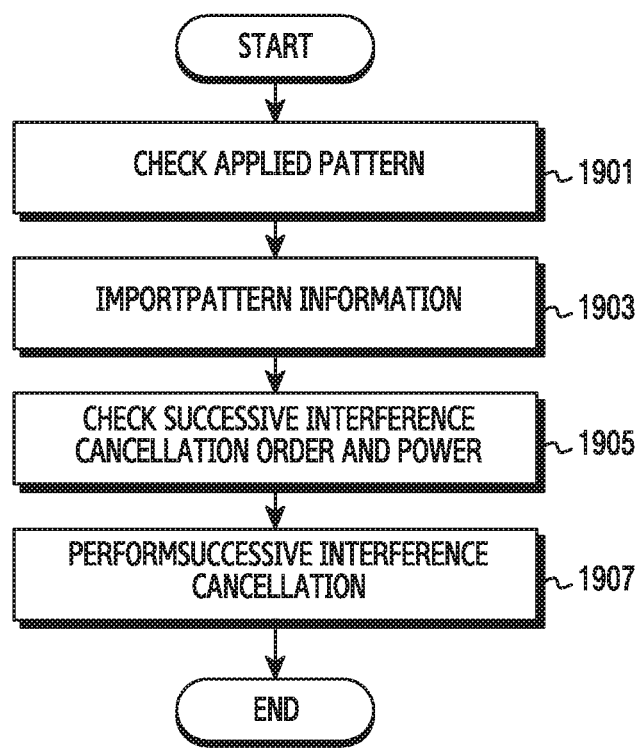
FIG. 19 illustrates a process in which a terminal performs successive interference cancellation based on predefined pattern information in a wireless communication system according to the fourth embodiment of the present invention.

FIG. 19 illustrates a process in which a terminal performs SIC based on predefined pattern information in a wireless communication system according to the fourth embodiment of the present invention.

Referring to FIG. 19, in operation 1901, the terminal 300 checks an applied pattern. The terminal 300 may check the resource allocation pattern determined by the base station 200.

In operation 1903, the terminal 300 loads pattern information. The terminal 300 may receive the pattern information in advance from the base station 200. The terminal 300 may load the pattern information received in advance from the base station 200.

In operation 1905, the terminal 300 checks a SIC order and power. The terminal 300 may check a power ratio with respect to at least one resource allocated to the terminal 300 based on the pattern information. The terminal 300 may check the SIC order for the terminal 300 based on the power ratio with respect to the at least one resource.

In operation 1907, the terminal 300 performs the SIC. The terminal 300 may perform the SIC based on the SIC order.

Figure 20A:
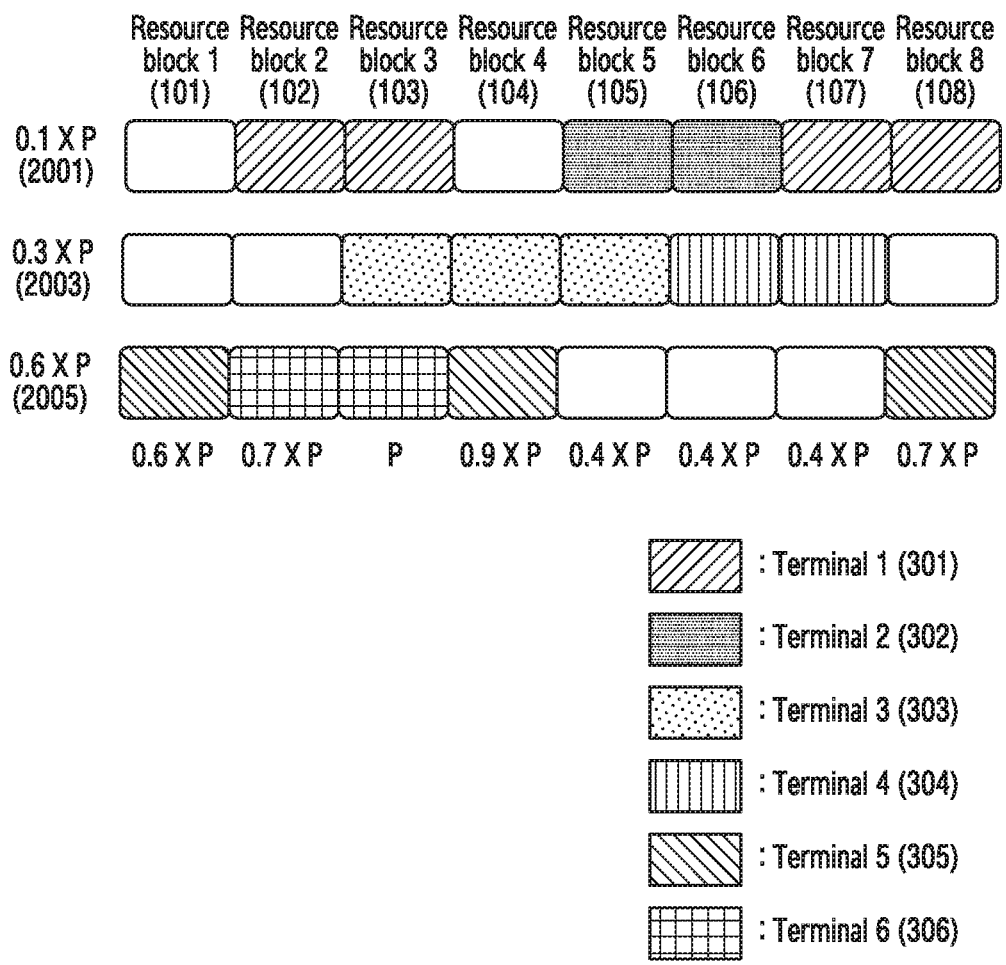
FIGS. 20a and 20b illustrate an example in which a base station allocates a resource using terminal grouping and implicit transmission power in a wireless communication system according to a fifth embodiment of the present invention.
Figure 20B:
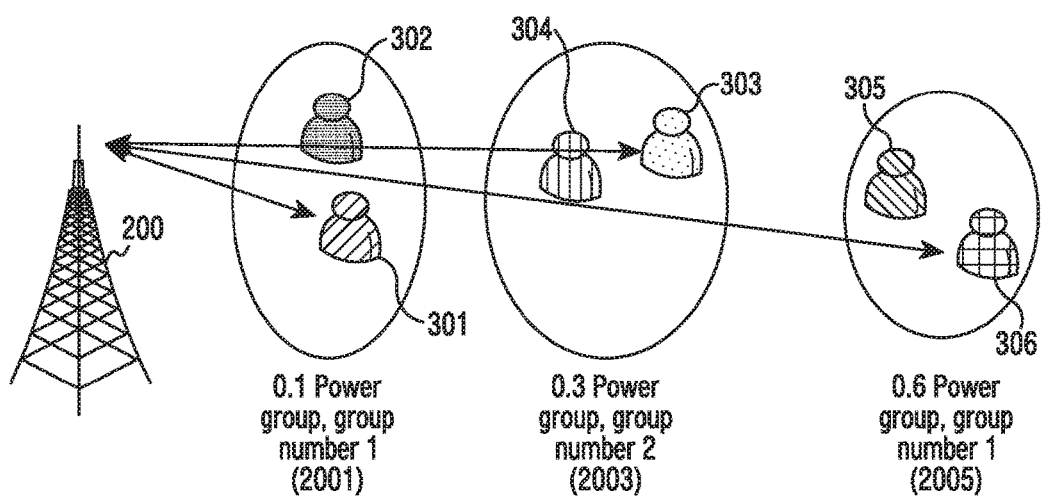

FIGS. 20a and 20b illustrate an example in which a base station allocates a resource using terminal grouping and implicit transmission power in a wireless communication system according to a fifth embodiment of the present invention.

Referring to FIG. 20a, the base station 200 may group terminals according to the power allocation ratio with respect to each resource. The base station 200 may allocate a RB 2 (102), a RB 3 (103), a RB 7 (107), and a RB 8 (108) to the terminal 1 (301), The base station 200 may determine the power ratio with respect to each of the RBs allocated to the terminal 1 (301) to be 0.1. In addition, the base station 200 may allocate a RB 5 (105) and a RB 6 (106) to the terminal 2 (302), The base station 200 may determine the power ratio with respect to each of the RBs allocated to the terminal 2 (302) to be 0.1.

The base station 200 may allocate RBs 3 to 5 (03 to 105) to a terminal 3 (303). The base station 200 may determine the power allocation ratio with respect to each of the RBs allocated to the terminal 3 (303) to be 0.3. In addition, the base station 200 may allocate a RB 6 (106) and the RB 7 (107) to a terminal 4 (104). The base station 200 may determine the power allocation ratio with respect to each of the RBs allocated to the terminal 4 (104) to be 0.3.

The base station 200 may allocate a RB 1 (101), the RB 4 (104), and the RB 8 (108) to a terminal 5 (305). The base station 200 may determine the power allocation ratio with respect to each of the RBs allocated to the terminal 5 (305) to be 0.6. In addition, the base station 200 may allocate the RB 2 (102) and the RB 3 (103) to a terminal 6 (306). The base station 200 may determine the power allocation ratio with respect to each of the RBs allocated to the terminal 6 (106) to be 0.6.

Referring to FIG. 20b, the base station 200 may determine the terminal 1 (101) and the terminal 2 (102) as a group 1 (2001) with a power allocation ratio of 0.1. The base station 200 may determine the terminal 3 (303) and the terminal 4 (304) as a group 2 (2003) with a power allocation ratio of 0.3. The base station 200 may determine the terminal 5 (305) and the terminal 6 (306) as a group 3 (2005) with a power allocation ratio of 0.6.

Information on resources allocated to the terminals 1 to 6 (301 to 306) may be represented by Table 5.

TABLE 5

| Terminal identifier | Resource allocation | | | | | | | | MCS | Group number |
|---|---|---|---|---|---|---|---|---|---|---|
| | RB 1 | RB 2 | RB 3 | RB 4 | RB 5 | RB 6 | RB 7 | RB 8 | | |
| Terminal 1 | | o | o | | | | o | o | Scheme 1 | 1 |
| Terminal 2 | | | | | o | o | | | Scheme 1 | 1 |
| Terminal 3 | | | o | o | o | | | | Scheme 2 | 2 |

TABLE 5-continued

| Terminal identifier | RB 1 | RB 2 | RB 3 | RB 4 | RB 5 | RB 6 | RB 7 | RB 8 | MCS | Group number |
|---|---|---|---|---|---|---|---|---|---|---|
| Terminal 4 | | | | | ○ | ○ | | | Scheme 2 | 2 |
| Terminal 5 | ○ | | ○ | | | | | ○ | Scheme 3 | 3 |
| Terminal 6 | | ○ | ○ | | | | | | Scheme 3 | 3 |

Figure 21A:
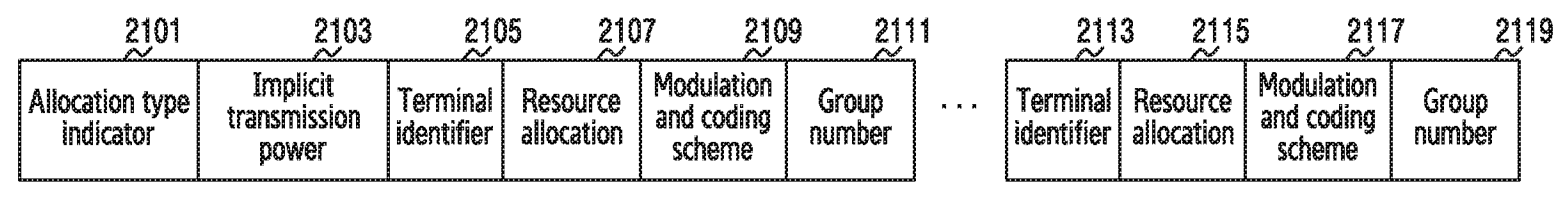

The base station 200 may transmit control information illustrated in FIG. 21a to the terminals 1 to 6 (301 to 306). Referring to FIG. 21a, the base station 200 may transmit, to the terminals 1 to 6 (301 to 306), the control information including an allocation type indicator 2101, implicit transmission power 2103, terminal identifiers 2105 and 2113, resource allocations 2107 and 2115, MCSs 2109 and 2117, and group numbers 2111 and 2119.

The implicit transmission power 2103 may include information on power allocation ratios set for the respective groups and power allocated to each resource. Therefore, each of the terminals may check power allocated for at least one RB allocated to the terminals based on the information on the power allocation ratios set for the groups and the power allocated to each resource.

For example, referring to FIG. 21b, the implicit transmission power 2103 may be represented by an integer of 25. The terminal identifiers 2105 and 2113 may be represented by an identification number assigned to the terminal 1 or the terminal 6. The resource allocations 2107 and 2115 may be represented by bits of 01100011 and 00000110, respectively. The MCSs 2109 and 2117 may be represented by binary numbers indicating modulation schemes used for the terminal 1 and the terminal 4, respectively. The group numbers 2111 and 2119 may be represented by 1 and 2, respectively.

For example, a process in which the terminal 1 (301) decodes a signal thereof in the RB 7 (107) is as follows. The terminal 1 (301) may identify that the terminal 1 (301) is included in the group 1 (2001) based on the control information. Also, the terminal 1 (301) may identify that the terminal 4 (304) is also allocated the RB 7 (107) by checking the resource allocation fields for all the terminals in the RB 7 (107). Since the terminal 1 (301) and the terminal included in the group 2 (2003) higher in group number than the group of the terminal 1 (301) are simultaneously allocated the RB, the terminal 1 (301) may recognize that it is necessary to perform SIC. The terminal 1 (301) may identify the group number 2 of the terminal 4 (304) and may identify that power is allocated at a ratio of 0.3. The terminal 1 (301) may calculate power allocated to the terminal 4 (304). For example, the terminal 1 (301) may calculate that a power of 25*0.3=7.5 is allocated for the terminal 4 (304) by multiplying 25 indicated by the implicit transmission power 2103 and 0.3 that is a predetermined power ratio for the group 2 (2003). The terminal 1 (301) may SIC, based on the power of 7.5 allocated to the terminal 4 (304) and a scheme 2, thereby decoding the signal allocated to the terminal 1 (301).

For example, a process in which the terminal 4 (304) decodes a signal thereof in the RB 7 (107) is as follows. The terminal 4 (304) may identify that the terminal 4 (304) is included in the group 2 (2003) based on the control information. Also, the terminal 4 (304) may identify that the terminal 1 (301) is also allocated the RB 7 (107) by checking the resource allocation fields for all the terminals in the RB 7 (107). However, since any terminal in the group 3 (2005) higher in group number than the group of the terminal 4 (304) is not allocated the RB, the terminal 4 (304) may recognize that it is not necessary to perform SIC. Since no SIC is necessary, the terminal 4 (304) may directly decode the allocated signal based on an MCS 2 for the terminal 4 (304).

Figure 22:
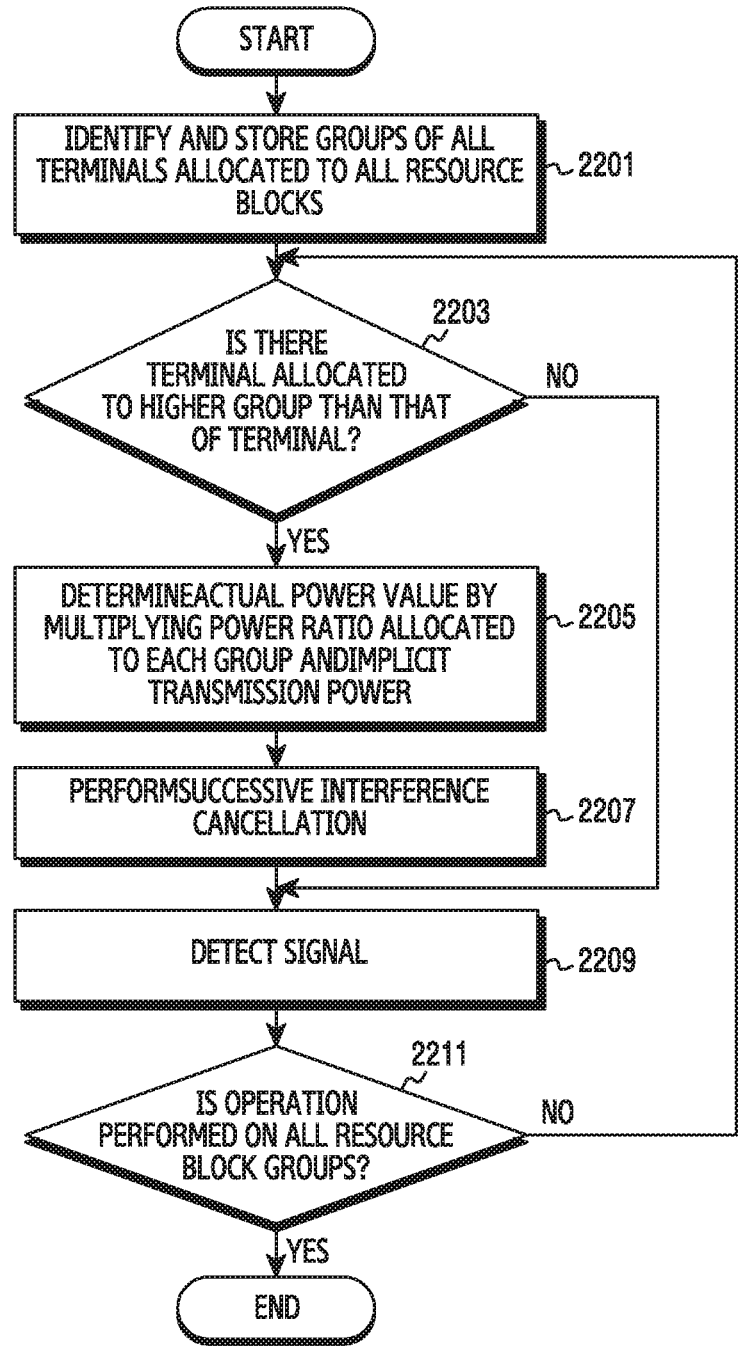
FIG. 22 illustrates a process in which a terminal decodes a signal based on a group number and implicit transmission power in a wireless communication system according to the fifth embodiment of the present invention.

FIG. 22 illustrates a process in which a terminal decodes a signal based on a group number and implicit transmission power in a wireless communication system according to the fifth embodiment of the present invention.

Referring to FIG. 22, in operation 2201, the terminal 300 identifies and stores a group number of the terminal and group numbers of all terminals displayed in control information. The terminal 300 may receive, from the base station 200, control information including information on the group number of the terminal 300 and the group numbers of all terminals. The terminal 300 may identify the group number of the terminal 300 and the group numbers of all terminals based on the control information.

In operation 2203, the terminal 300 identifies whether there is a terminal allocated to a group higher than the group number of the terminal. For example, when the terminal 300 has a group number 1 and there is no terminal allocated to a group number 2 or a group number 3, the terminal 300 detects a signal in a signal detection operation. For example, when the terminal 300 has the group number 2 and there is no terminal allocated to the group number 3, the terminal 300 detects a signal in operation 2209.

When there is a terminal allocated to a group higher than the group number of the terminal in operation 2203, the terminal 300 performs operation 2205. For example, when the terminal 300 has the group number 1 and there is at least one terminal among a terminal having the group number 2 and a terminal having the group number 3, the terminal 300 may perform operation 2205.

In operation 2205, the terminal 300 calculates an actual power value by multiplying a power ratio allocated to each group and implicit transmission power. The terminal 300 calculates a power value allocated to the terminal 300 and power allocated to a terminal of a higher group in the same RB by multiplying the power ratio allocated to each group and the implicit transmission power. The terminal 300 may calculate the power value allocated to the terminal 300 by multiplying the power ratio allocated to one RB and the power ratio allocated between the terminal 300 and other terminals in the one RB.

In operation 2207, the terminal 300 performs SIC. The terminal 300 may determine the SIC order based on the power value. The terminal 300 may perform the SIC according to the SIC order.

In operation 2209, the terminal 300 detects a signal. The terminal 300 may detect a signal transmitted to the terminal 300 through the SIC.

In operation 2211, the terminal 300 determines whether operations 2203 through 2209 have been performed for all RB groups. When it is determined that operations 2203 through 2209 have not been performed for all RB groups, the terminal 300 returns to operation 2203 and determines whether there is a terminal assigned to a higher group than that of the terminal 300.

According to the embodiment of the present invention, the base station 200 may generate the control information in which a resource allocation field value is expressed in bits. The base station 200 may not use a quantized representation for indicating power allocated for each RB. Accordingly, the base station 200 can use the resource allocation field value expressed in bits, instead of using the quantized resource allocation field value, thus reducing the size of the control information.

Figure 23:
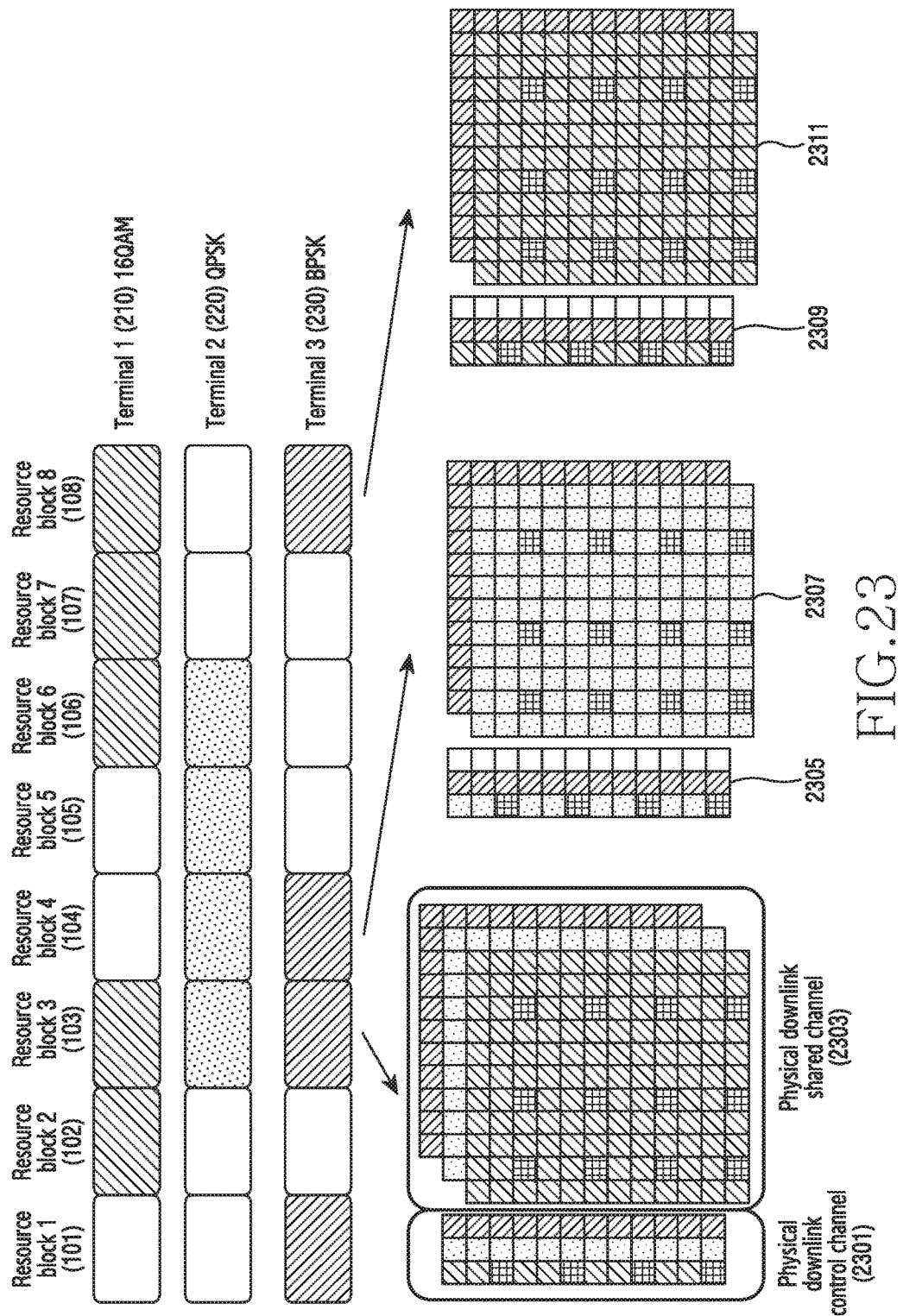
FIG. 23 illustrates a control channel and a data channel for a terminal to identify a successive interference cancellation order through the location of downlink control information in a wireless communication system according to a sixth embodiment of the present invention.

FIG. 23 illustrates a control channel and a data channel for a terminal to identify a SIC order through the location of downlink control information in a wireless communication system according to a sixth embodiment of the present invention.

Referring to FIG. 23, a base station 200 may allocate a RB 2 (102), a RB 3 (103), and RBs 6 to 8 (106 to 108) to a terminal 1 (301) using a 16 Quadrature Amplitude Modulation (16QAM) scheme. Further, the base station 200 may allocate RBs 3 to 6 (103 to 106) to a terminal 2 (302) using a QPSK scheme. Also, the base station 200 may allocate a RB 1 (101), the RB 3 (103), the RB 4 (104), and the RB 8 (108) using a BPSK scheme.

The base station 200 may report the SIC order to the terminal 1 to the terminal 3 (301 to 303) through the location of downlink control information in a control channel. For example, the base station 200 may sequentially display control information on the RB 3 (103) allocated to the terminal 1 (301), control information on the RB 3 (103) allocated to the terminal 2 (302), and downlink control information on the RB 3 103 allocated to the terminal 3 (303), from the left, in a physical downlink control channel for the RB 3 (103). In addition, the base station 200 may sequentially display control information on the RB 4 (104) allocated to the terminal 2 (302) and downlink control information on the RB 4 (104) allocated to the terminal 3 (303), from the left, in a physical downlink control channel for the RB 4 (104). Also, the base station 200 may display control information on the RB 8 (108) allocated to the terminal 1 (301) and control information on the RB 8 (108) allocated to the terminal 3 (303), from the left, in a physical downlink control channel for the RB 8 (108). The base station 200 may determine the power allocation ratios of the terminals 1 to 3 (301 to 303) according to the order in which the pieces of downlink control information are displayed in the physical downlink control channels. For example, the base station 200 may allocate power at ratios of 0.6, 0.3, and 0.1 in the order from the left to the right of the physical downlink control channels. For example, in the RB 3 (103), the base station 200 may allocate power for the terminal 1 (301) at a ratio of 0.6, for the terminal 2 (302) at a ratio of 0.3, and for the terminal 3 (303) at a ratio of 0.1.

The terminals 1 to 3 (301 to 303) may determine a SIC order according to the order of the RBs displayed in the physical downlink control channels. For example, in the RB 3 (103), the terminal 1 (301) may identify that downlink control information on the RB 3 (103) allocated to the terminal 1 (301) is displayed first in the physical downlink control channel. The terminal 1 (301) may identify that 0.6 power is allocated to the terminal 1 (301) in the RB 3 (103) based on the order of the downlink control information. Likewise, the terminal 2 (302) may identify that 0.3 power is allocated to the terminal 2 (302) in the RB 3 (103) based on the order of the downlink control information. Also, the terminal 3 (303) may identify that 0.1 power is allocated to the terminal 3 (303) in the RB 3 (103) based on the order of the downlink control information.

Figure 24:
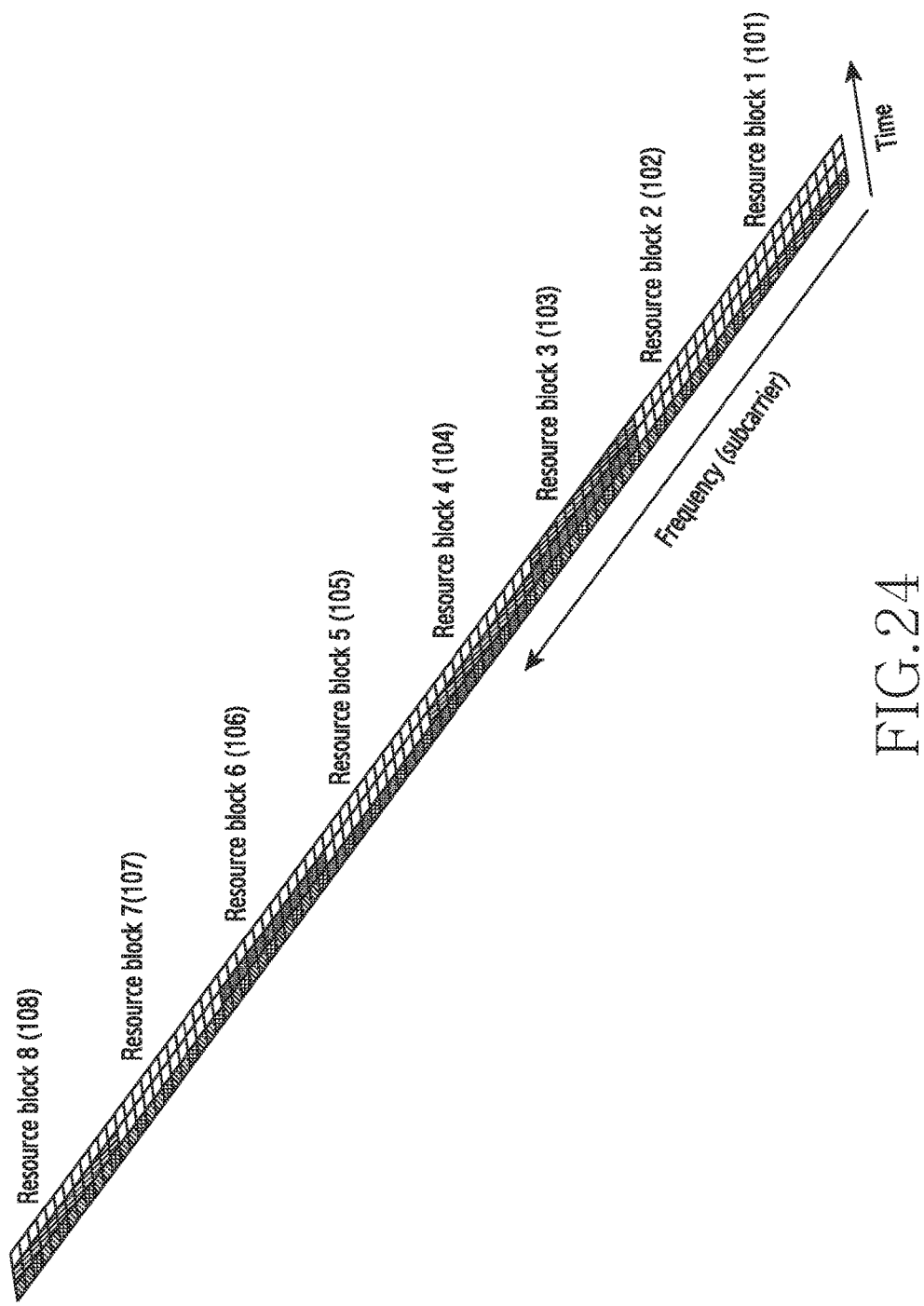
FIG. 24 illustrates resource blocks allocated to a plurality of terminals in a wireless communication system according to the sixth embodiment of the present invention.

The physical downlink control channel 2301 for all RBs of the RB 1 (101) to RB 8 (108) illustrated in FIG. 23 may be represented by FIG. 24, Referring to FIG. 24, the base station 200 may determine the location of downlink control information on each RB in the physical downlink control channel 2301.

According to another embodiment of the present invention, a criterion for the order of the downlink control information may be the right side, the upper side, or the lower side of the physical downlink control channel.

Figure 25A:
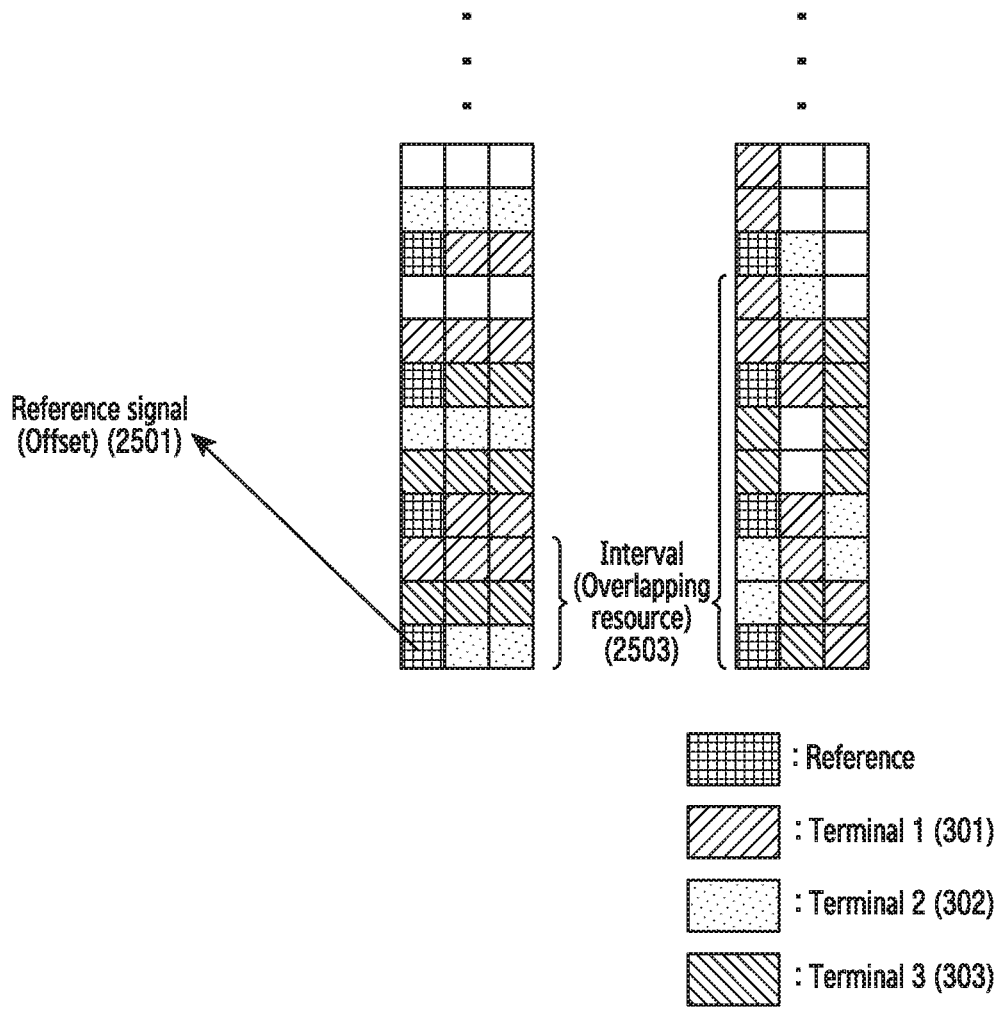
FIGS. 25a and 25b are examples of representing the number of overlapping resources in a wireless communication system according to the sixth embodiment of the present invention.
Figure 25B:
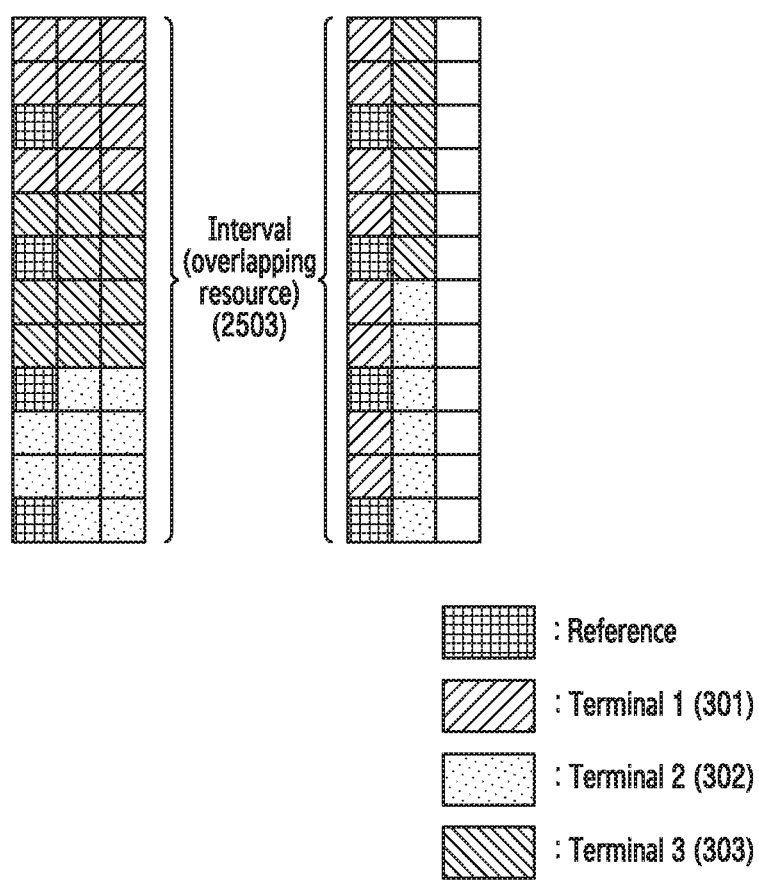

FIGS. 25a and 25b are examples of the order in which resources are repetitively disposed in a wireless communication system according to the sixth embodiment of the present invention.

The terminal 1 to the terminal 3 (301 to 303) may determine the SIC order of the terminal 1 to the terminal 3 (301 to 303) based on a reference signal 2501. For example, the terminal 1 to the terminal 3 (301 to 303) may determine the location of control information allocated to the terminal 1 to the terminal 3 (301 to 303) based on the reference signal 2501. The terminal 1 to the terminal 3 (301 to 303) may determine the SIC order of the terminal 1 to the terminal 3 (301 to 303) based on the location of the control information. For example, the control information on the terminal 1 (301) may be located at the third position from the reference signal 2501 on the right. Here, the terminal 1 (301) may identify that the terminal 1 (301) has the third priority in the SIC order.

Figure 26:
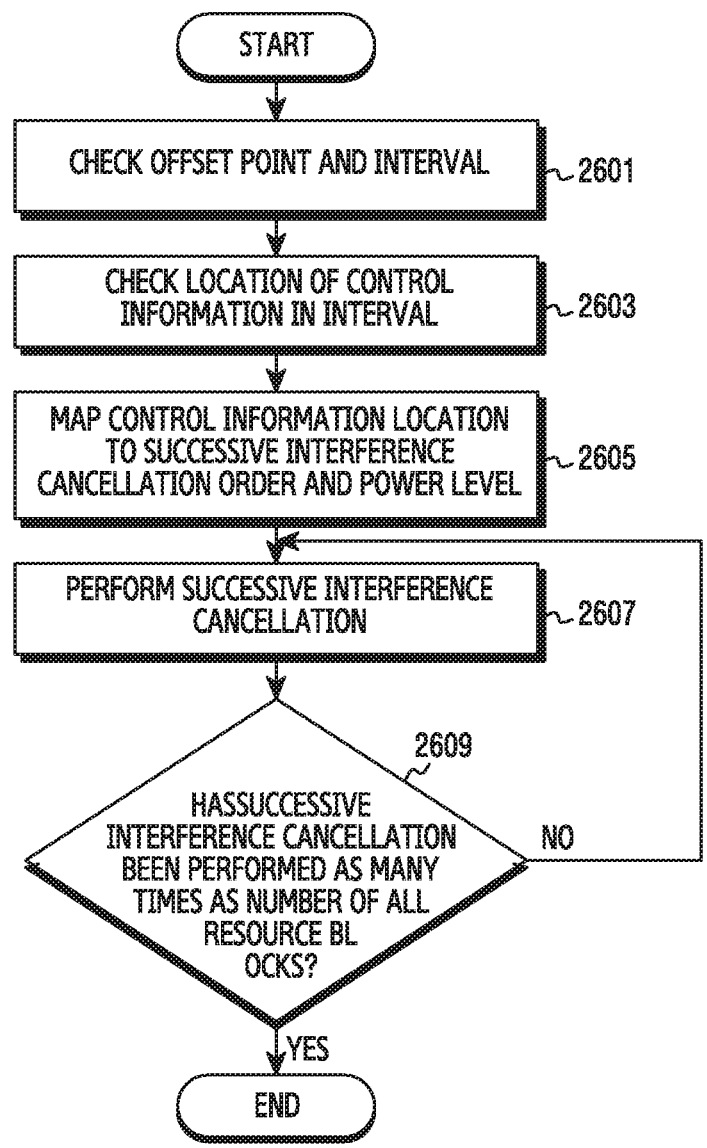
FIG. 26 illustrates a process in which a terminal performs successive interference cancellation based on the location of downlink control information in a physical downlink control channel in a wireless communication system according to the sixth embodiment of the present invention.

FIG. 26 illustrates a process in which a terminal performs SIC based on the location of downlink control information in a physical downlink control channel in a wireless communication system according to the sixth embodiment of the present invention.

Referring to FIG. 26, in operation 2601, the terminal 300 checks an offset point and an offset interval. The terminal 300 may check the offset point and the offset interval in the physical downlink control channel.

In operation 2603, the terminal 300 checks the location of the downlink control information in the offset interval. The terminal 300 may check in which position the control information on the terminal 300 is located from a reference point. For example, the terminal 300 may identify that the control information on the terminal 300 is located at the third position from the reference point.

In operation 2605, the terminal 300 checks a SIC order and allocated power based on the location of the downlink control information. The terminal 300 may determine a SIC order based on the location of the downlink control information. The terminal 300 may check in which position the control information on the terminal 300 is located from the reference point. For example, when the control information on the terminal 300 is located at the third position from the reference point, the terminal 300 may identify that the terminal 300 has the third priority in the SIC order.

In operation 2607, the terminal 300 performs SIC. The terminal 300 may perform the SIC based on the downlink control information.

In operation 2609, the terminal 300 determines whether the SIC has been performed as many times as the number of all RBs. When the SIC has not been performed as many times as the number of all the RBs, the terminal 300 returns to operation 2607 and performs the SIC.

Figure 27:
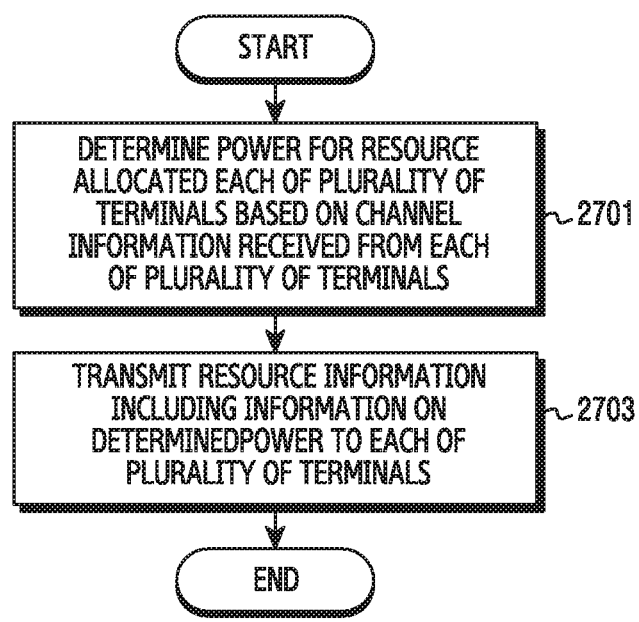
FIG. 27 illustrates the operation process of a base station according to embodiments of the present invention.

FIG. 27 illustrates the operation process of a base station according to the sixth embodiment of the present invention.

Referring to FIG. 27, in operation 2701, the base station 200 determines power for use by each of a plurality of terminals with respect to a resource allocated to be shared by the plurality of terminals based on channel information received from each of the plurality of terminals.

The base station 200 may determine the coherence bandwidth value of a channel for each of the plurality of terminals. The base station 200 may generate at least one RIB group including at least one RB allocated to each of the plurality of terminals based on the coherence bandwidth value. Information on the power may include information on the at least one RB group.

The base station 200 may determine a terminal having a channel state equal to or greater than a predefined threshold state among the plurality of terminals based on the channel information received from each of the plurality of terminals. The base station 200 may allocate RBs such that the end point of RBs allocated to the terminal is matched with the end point of RBs allocated to at least one other terminal. The information on the power may include the information on the at least one RB group.

The base station 200 may determine an allocation pattern of at least one resource for allocation to each of the plurality of terminals. The base station 200 may generate information on the allocation pattern of the at least one resource. The information on the power may include the information on the allocation pattern of the at least one resource.

The base station 200 may group the plurality of terminals into at least one group. The base station 200 may determine a power allocation for the at least one group. The base station 200 may determine a power allocation for a resource allocated to the at least one group. The information on the power may include information on the power allocation for the at least one group and the power allocation for the resource allocated to the at least one group.

The base station 200 may determine the order of pieces of control information corresponding to the plurality of terminals based on the level of power for a resource allocated to the plurality of terminals. The base station 200 may dispose the pieces of control information in a control channel based on the determined order. The information on the power may include information on the order of the pieces of control information disposed in the control channel.

In operation 2703, the base station 200 transmits resource information including the information on the determined power to each of the plurality of terminals.

Figure 28:
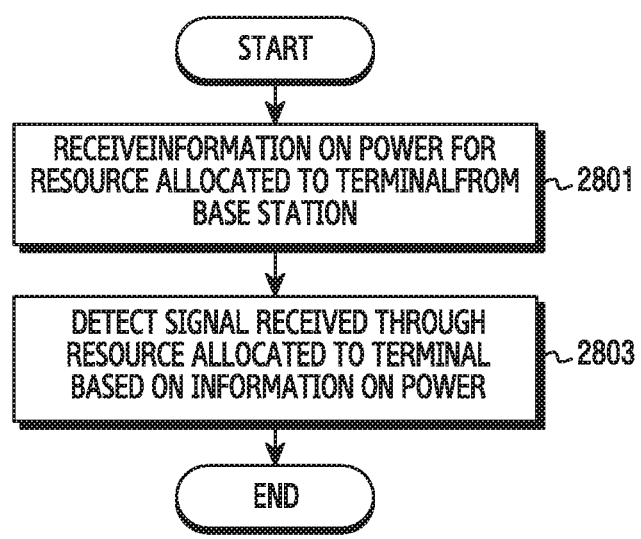
FIG. 28 illustrates the operation process of a terminal according to embodiments of the present invention.

FIG. 28 illustrates the operation process of a terminal according to embodiments of the present invention.

Referring to FIG. 28, in operation 2801, the terminal 300 receives, from a base station, information on power for the use of a resource allocated to the terminal.

In operation 2803, the terminal 300 detects a signal received through the resource allocated to the terminal based on the information on the power.

The terminal 300 may detect the received signal based on information on a RB group allocated to the terminal. The information on the power may include the information on the RB group allocated to the terminal.

The terminal 300 may identify the start point of at least one RB allocated to the terminal. The terminal 300 may identify the number of at least one RB allocated to the terminal. The information on the power may include information on the start point of the at least one RB and the number of at least one RB.

The terminal 300 may detect the received signal based on information on an allocation pattern of the at least one RB allocated to the terminal. The information on the power may include the information on the allocation pattern of the at least one RB allocated to the terminal.

The terminal 300 may identify a power ratio allocated for the at least one RB allocated the terminal. The terminal 300 may identify a power ratio allocated for the terminal in the power ratio allocated for the at least one RB. The terminal 300 may detect the received signal based on the power ratio allocated for the at least one RIB and the power ratio allocated for the terminal in the power ratio allocated for the at least one RB. The information on the power may include information on the power ratio allocated for the at least one RB and the power ratio allocated for the terminal in the power ratio allocated for the at least one RB.

The terminal 300 may identify the order of pieces of control information in a control channel of the terminal. The terminal 300 may detect the received signal according to the order of the pieces of control information. The information on the power may include information on the order of the pieces of control information.

Figure 29:
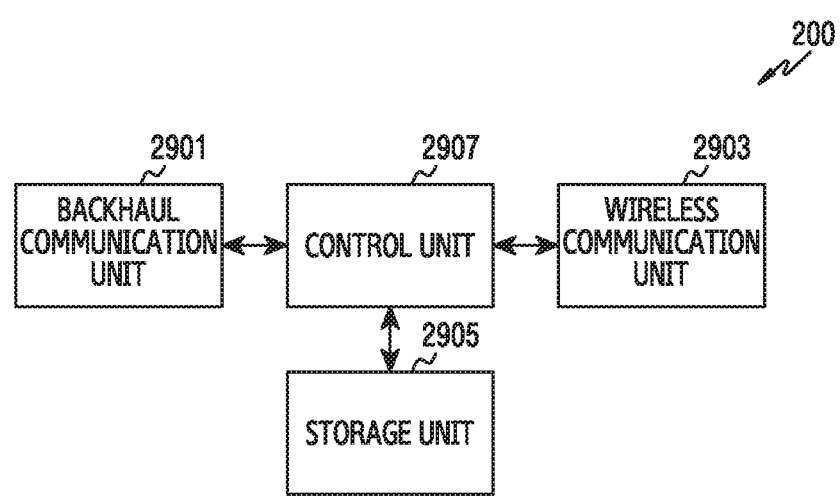
FIG. 29 is a block diagram illustrating the configuration of a base station according to embodiments of the present invention.

FIG. 29 is a block diagram illustrating the configuration of a base station according to embodiments of the present invention.

Referring to FIG. 29, the base station 200 includes a backhaul communication unit 2901, a wireless communication unit 2903, a storage unit 2905, and a control unit 2907.

The backhaul communication unit 2901 provides an interface for performing communication with other nodes in a network. That is, the backhaul communication unit 2901 converts a bit stream, transmitted from the base station 200 to another node, for example, another base station, a core network, or the like, into a physical signal, and converts a physical signal, received from another node, into a bit stream.

The wireless communication unit 2903 may include a Radio Frequency (RF) processor (not shown) and a baseband processor (not shown). The RF processor performs a function for transmitting or receiving a signal through a wireless channel, for example, converting the band of a signal and amplifying a signal. That is, the RF processor may upconvert a baseband signal, provided form the baseband processor, into a RF band signal and may transmit the RF band signal through an antenna. The RF processor may downconvert a RF band signal, received through the antenna, into a baseband signal. For example, the RF processor may include a transmission filter, a reception filter, an amplifier, a mixer, an oscillator, a Digital-to-Analog Converter (DAC), an Analog-to-Digital Converter (ADC), or the like. The base station 200 may include a plurality of antennas. In addition, the RF processor may include a plurality of RF chains. Further, the RF processor may perform beamforming. For the beamforming, the RF processor may adjust the phase and strength of signals transmitted and received through a plurality of antennas or antenna elements.

The baseband processor may perform a function of converting between a baseband signal and a bit stream according to the physical layer specification of a system. For example, in data transmission, the baseband processor encodes and modulates a transmitted bit stream to generate complex symbols. Further, in data reception, the baseband processor demodulates and decodes a baseband signal, provided from the RF processor, to reconstruct a received bit stream. For example, according to OFDM, in data transmission, the baseband processor encodes and modulates a transmitted bit stream to generate complex symbols, maps the complex symbols to subcarriers, and performs an IFFF operation and CP insertion, thereby forming OFDM symbols. Further, in data reception, the baseband processor divides a baseband signal provided from the RF processor into OFDM symbol units, reconstructs signals mapped to subcarriers through an FFT operation, and performs demodulation and decoding, thereby reconstructing a bit stream. The baseband processor and the RF processor transmit and receive signals as described above. Accordingly, the baseband processor and the RF processor may be referred to as a transmission unit, a reception unit, a transceiver, or a communication unit.

The wireless communication unit 2903 according to the embodiments of the present invention may transmit resource information including information on power determined by the control unit 2907 to each of the plurality of terminals.

The storage unit 2905 stores data, such as a basic program, an application program, and configuration information, for the operation of the base station 200. The storage unit 2905 provides the stored data by request from the control unit 2907.

The storage unit 2905 according to the embodiments of the present invention may store information on power including information on an allocation pattern of at least one resource. The storage unit 2905 may store information on power including information on a power allocation for at least one group and a power allocation for a resource allocated to the at least one group. The storage unit 2905 may store information on power including information on the order of pieces of control information disposed in a control channel.

The control unit 2907 controls the overall operation of the base station 200. For example, the control unit 2907 may transmit or receive a signal through the wireless communication unit 2903 or the backhaul communication unit 2901. Further, the control unit 2907 records and reads data in the storage unit 2905. To this end, the control unit 2907 may include at least one processor.

According to the embodiments of the present invention, the control unit 2907 may determine power for use by each of a plurality of terminals with respect to a resource allocated to be shared by the plurality of terminals based on channel information received from each of the plurality of terminals.

The control unit 2907 may determine the coherence bandwidth value of a channel for each of the plurality of terminals. The control unit 2907 may generate at least one RB group including at least one RB allocated to each of the plurality of terminals based on the coherence bandwidth value.

The control unit 2907 may determine a terminal having a channel state equal to or greater than a predefined threshold state among the plurality of terminals based on the channel information received from each of the plurality of terminals. The control unit 2907 may allocate RBs such that the end point of RBs allocated to the terminal 300 is matched with the end point of RBs allocated to at least one other terminal.

The control unit 2907 may determine an allocation pattern of at least one resource for allocation to each of the plurality of terminals. The control unit 2907 may generate information on the allocation pattern of the at least one resource. Information on the power may include the information on the allocation pattern of the at least one resource.

The control unit 2907 may group the plurality of terminals into at least one group and may determine a power allocation for the at least one group. The control unit 2907 may determine a power allocation for a resource allocated to the at least one group. The information on the power may include information on the power allocation for the at least one group and the power allocation for the resource allocated to the at least one group.

The control unit 2907 may determine the order of pieces of control information corresponding to the plurality of terminals based on the level of power for a resource allocated to the plurality of terminals. The control unit 2907 may dispose the pieces of control information in a control channel based on the determined order. The information on the power may include information on the order of the pieces of control information disposed in the control channel.

Figure 30:
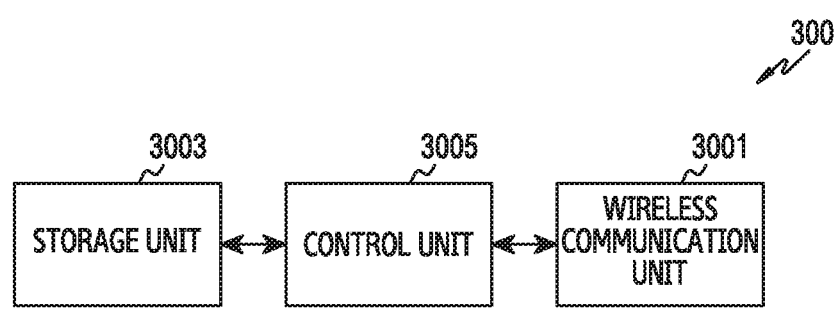
FIG. 30 is a block diagram illustrating the configuration of a terminal according to embodiments of the present invention.

FIG. 30 is a block diagram illustrating the configuration of a terminal according to embodiments of the present invention.

Referring to FIG. 30, the terminal 300 includes a wireless communication unit 3001, a storage unit 3003, and a control unit 3005.

The wireless communication unit 3001 may include a Radio Frequency (RF) processor (not shown) and a baseband processor (not shown). The RF processor performs a function for transmitting or receiving a signal through a wireless channel, for example, converting the band of a signal and amplifying a signal. That is, the RF processor may upconvert a baseband signal, provided form the baseband processor, into a RF band signal and may transmit the RF band signal through an antenna. The RF processor may downconvert a RF band signal, received through the antenna, into a baseband signal. For example, the RF processor may include a transmission filter, a reception filter, an amplifier, a mixer, an oscillator, a Digital-to-Analog Converter (DAC), an Analog-to-Digital Converter (ADC), or the like. The terminal 300 may include a plurality of antennas. In addition, the RF processor may include a plurality of RF chains. Further, the RF processor may perform beamforming. For the beamforming, the RF processor may adjust the phase and strength of signals transmitted and received through a plurality of antennas or antenna elements.

The baseband processor may perform a function of converting between a baseband signal and a bit stream according to the physical layer specification of a system. For example, in data transmission, the baseband processor encodes and modulates a transmitted bit stream to generate complex symbols. Further, in data reception, the baseband processor demodulates and decodes a baseband signal, provided from the RF processor, to reconstruct a received bit stream. For example, according to OFDM, in data transmission, the baseband processor encodes and modulates a transmitted bit stream to generate complex symbols, maps the complex symbols to subcarriers, and performs an IFFF operation and CP insertion, thereby forming OFDM symbols. Further, in data reception, the baseband processor divides a baseband signal provided from the RF processor into OFDM symbol units, reconstructs signals mapped to subcarriers through an FFT operation, and performs demodulation and decoding, thereby reconstructing a bit stream. The baseband processor and the RF processor transmit and receive signals as described above. Accordingly, the baseband processor and the RF processor may be referred to as a transmission unit, a reception unit, a transceiver, or a communication unit.

The wireless communication unit 3001 according to the embodiments of the present invention may receive, from a base station 200, information on power for using a resource allocated to the terminal 300.

The storage unit 3003 stores data, such as a basic program, an application program, and configuration information, for the operation of the terminal 300. The storage unit 3003 provides the stored data by request from the control unit 3005.

The storage unit 3003 according to the embodiments of the present invention may store information on power including information on a RB group allocated to the terminal 300. The storage unit 3003 may store information on power including information on an allocation pattern of at least one RB allocated to the terminal 300, The storage unit 3003 may store information on a power ratio allocated for at least one RB and a power ratio allocated for the terminal in the power ratio allocated for the at least one RB. The storage unit 3003 may store information on power including information on the order of pieces of control information.

The control unit 3005 controls the overall operation of the terminal 300. For example, the control unit 3005 may transmit or receive a signal through the wireless communication unit 3001. Further, the control unit 3005 records and reads data in the storage unit 3003. To this end, the control unit 3005 may include at least one processor.

According to the embodiments of the present invention, the control unit 3005 may detect a signal received through the resource allocated to the terminal based on the information on the power.

The control unit 3005 may detect the received signal based on information on a RB group allocated to the terminal 300. The information on the power may include the information on the RB group allocated to the terminal 300.

The control unit 3005 may identify the start point of at least one RB allocated to the terminal 300. The control unit 3005 may identify the number of at least one RB allocated to the terminal 300.

The control unit 3005 may detect the received signal based on information on an allocation pattern of the at least one RB allocated to the terminal 300. The information on the power may include the information on the allocation pattern of the at least one RB allocated to the terminal 300.

The control unit 3005 may identity a power ratio allocated for the at least one allocated to the terminal 300, may identify a power ratio allocated for the terminal 300 in the power ratio allocated for the at least one RB, and may detect the received signal based on the power ratio allocated for the at least one RB and the power ratio allocated for the terminal in the power ratio allocated for the at least one RB. The information on the power may include information on the power ratio allocated for the at least one RB and the power ratio allocated for the terminal in the power ratio allocated for the at least one RB.

The control unit 3005 may identify the order of pieces of control information in a control channel of the terminal 300. The control unit 3005 may detect the received signal according to the order of the pieces of control information. The information on the power may include information on the order of the pieces of control information.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present invention as defined by the appended claims and/or disclosed herein.

Although specific exemplary embodiments have been described in the detailed description of the present invention, various change and modifications may be made without departing from the spirit and scope of the present invention. Therefore, the scope of the present invention should not be defined as being limited to the embodiments, but should be defined by the appended claims and equivalents thereof.

The invention claimed is:

1. A method for operating a first terminal in a wireless communication system, the method comprising:
   receiving, from a base station, control information of a resource block group for indicating a power ratio allocated to the resource block group;
   identifying, based on the control information, a first power ratio allocated to a first terminal associated with a resource block in the resource block group and a second power ratio allocated to a second terminal associated with the resource block, wherein the identifying the first power ratio comprises:
      identifying a power ratio allocated to at least one resource block allocated to the first terminal, and
      identifying the first power ratio allocated to the first terminal among the power ratio allocated to the at least one resource block;
   receiving, from the base station, signals on the resource block, the signals including a first downlink signal for the first terminal and a second downlink signal for the second terminal; and
   detecting, based on the first power ratio and the second power ratio, the first downlink signal among the signals.

2. The method of claim 1, further comprising:
   identifying a start point of the at least one resource block allocated to the first terminal; and
   identifying a number of the at least one resource block allocated to the first terminal,
   wherein the control information comprises information on the start point of the at least one resource block and the number of the at least one resource block.

3. The method of claim 1, further comprising:
   detecting the first downlink signal based on information on an allocation pattern of the at least one resource block allocated to the first terminal,
   wherein the control information comprises the information on the allocation pattern of the at least one resource block allocated to the first terminal.

4. The method of claim 1, further comprising:
   identifying an order of signals in the control information; and
   detecting the first downlink signal according to the order of the signals, and
   wherein the control information comprises information of the order of the signals.

5. The method of claim 1,
   wherein the control information of the resource block group comprises a power ratio per terminal.

6. The method of claim 1,
   wherein a number of resource blocks in the resource block group is determined by the base station, based on a coherence bandwidth for a channel.

7. An apparatus for a base station in a wireless communication system, the apparatus comprising:
   a transceiver; and
   at least one processor operatively coupled with the transceiver, wherein the at least one processor is configured to:
  determine powers for each of a plurality of terminals with respect to a resource block group based on channel information received from the each of the plurality of terminals, the resource block group comprising a resource block allocated to be shared by the plurality of terminals,
  determine an order of signals corresponding to the plurality of terminals based on a size of a power that is allocated to the resource block allocated to the plurality of terminals,
  generate control information of the resource block group for indicating a power ratio allocated to the resource block group,
  dispose the control information into a control channel based on the determined order, and
  transmit the control information to the each of the plurality of terminals wherein the control information comprises information on the order of the signals.

8. The apparatus of claim 7, wherein the at least one processor is further configured to:
  determine a coherence bandwidth value of a channel for the each of the plurality of terminals,
  determine a number of resource blocks in the resource block group based on the coherence bandwidth, and
  generate the resource block group based on the determined number of resource blocks.

9. The apparatus of claim 7, wherein the at least one processor is further configured to:
  determine a terminal having a channel state equal to or greater than a predefined threshold state among the plurality of terminals based on the channel information received from the each of the plurality of terminals, and
  allocate a resource block such that an end point of the resource block allocated to the terminal is matched with an end point of a resource block allocated to at least one other terminal, and
  wherein the control information comprises information on a start point of the resource block allocated to the terminal and a number of the resource block.

10. The apparatus of claim 7, wherein the at least one processor is further configured to:
  determine an allocation pattern of at least one resource for allocation to the each of the plurality of terminals, and
  generate information on the allocation pattern of the at least one resource, and
  wherein the control information comprises the information on the allocation pattern of the at least one resource.

11. The apparatus of claim 7, wherein the at least one processor is further configured to:
  group the plurality of terminals into at least one group,
  determine a power allocation for the at least one group, and
  determine a power allocation for a resource allocated to the at least one group, and wherein the control information comprises information on the power allocation for the at least one group and information on the power allocation for the resource.

12. An apparatus for a first terminal in a wireless communication system, the apparatus comprising:
  a transceiver; and
  at least one processor operatively coupled with the transceiver,
  wherein the at least one processor is configured control to:
    receive, from a base station, control information of a resource block group for indicating a power ratio allocated to the resource block group,
    identify, based on the control information, a first power ratio allocated to a first terminal associated with a resource block in the resource block group and a second power ratio allocated to a second terminal associated with the resource block, wherein, in order to identify the first power ratio, the at least one processor is configured to:
      identify a power ratio allocated to at least one resource block allocated to the first terminal, and
      identify the first power ratio allocated to the first terminal among the power ratio allocated to the at least one resource block,
    receive, from the base station, signals on the resource block, the signals including a first downlink signal for the first terminal and a second downlink signal for the second terminal, and
    detect, based on the first power ratio and the second power ratio, the first downlink signal among the signals.

13. The apparatus of claim 12, wherein the at least one processor is further configured to:
  identify a start point of the at least one resource block allocated to the first terminal, and
  identify a number of the at least one resource block allocated to the first terminal, and
  wherein the control information comprises information on the start point of the at least one resource block and the number of the at least one resource block.

14. The apparatus of claim 12, wherein the at least one processor is further configured to:
  identify an order of signals in the control information, and
  detect the first downlink signal according to the order of the signals,
  wherein the control information comprises information of the order of the signal.

15. The apparatus of claim 12,
  wherein the control information of the resource block group comprises a power ratio per terminal.

16. The apparatus of claim 12,
  wherein a number of resource blocks in the resource block group is determined by the base station, based on a coherence bandwidth for a channel.

* * * * *